United States Patent

Konno et al.

Patent Number: 6,046,852
Date of Patent: Apr. 4, 2000

[54] LENS SYSTEM WITH IMAGE BLUR CORRECTION

[75] Inventors: Kenji Konno, Daito; Kohtaro Hayashi, Toyonaka, both of Japan

[73] Assignee: Minolta Co., Ltd., Osaka, Japan

[21] Appl. No.: 08/805,083

[22] Filed: Feb. 24, 1997

[30] Foreign Application Priority Data

Feb. 27, 1996 [JP] Japan ................................. H8-040041

[51] Int. Cl.[7] .................................................. G02B 27/64
[52] U.S. Cl. ........................................... 359/557; 359/784
[58] Field of Search .................... 359/554, 557, 359/784, 787, 786

[56] References Cited

U.S. PATENT DOCUMENTS 5,502,594  3/1996  Suzuki et al. .
5,579,171  11/1996  Suzuki et al. ............................ 359/687

*Primary Examiner*—Cassandra Spyrou
*Assistant Examiner*—Mark A. Robinson
*Attorney, Agent, or Firm*—Price Gess & Ubell

[57] ABSTRACT

In a zoom lens system that consists of a plurality of lens units and that performs zooming by varying the distances between the lens units, one of the lens units other than the lens unit disposed at the object side end includes a hand-shake correction lens unit that is decentered in a direction perpendicular to the optical axis for hand-shake correction and a fixed lens unit that is disposed on the image side of the hand-shake correction lens unit and that is kept in a fixed position during hand-shake correction. With respect to the lens element disposed at the image-side end of the hand-shake correction lens unit and the lens element disposed next to the image-side surface of the former lens element and kept in a fixed position during hand-shake correction, the relations between their shape factors and refractive powers are defined.

37 Claims, 25 Drawing Sheets

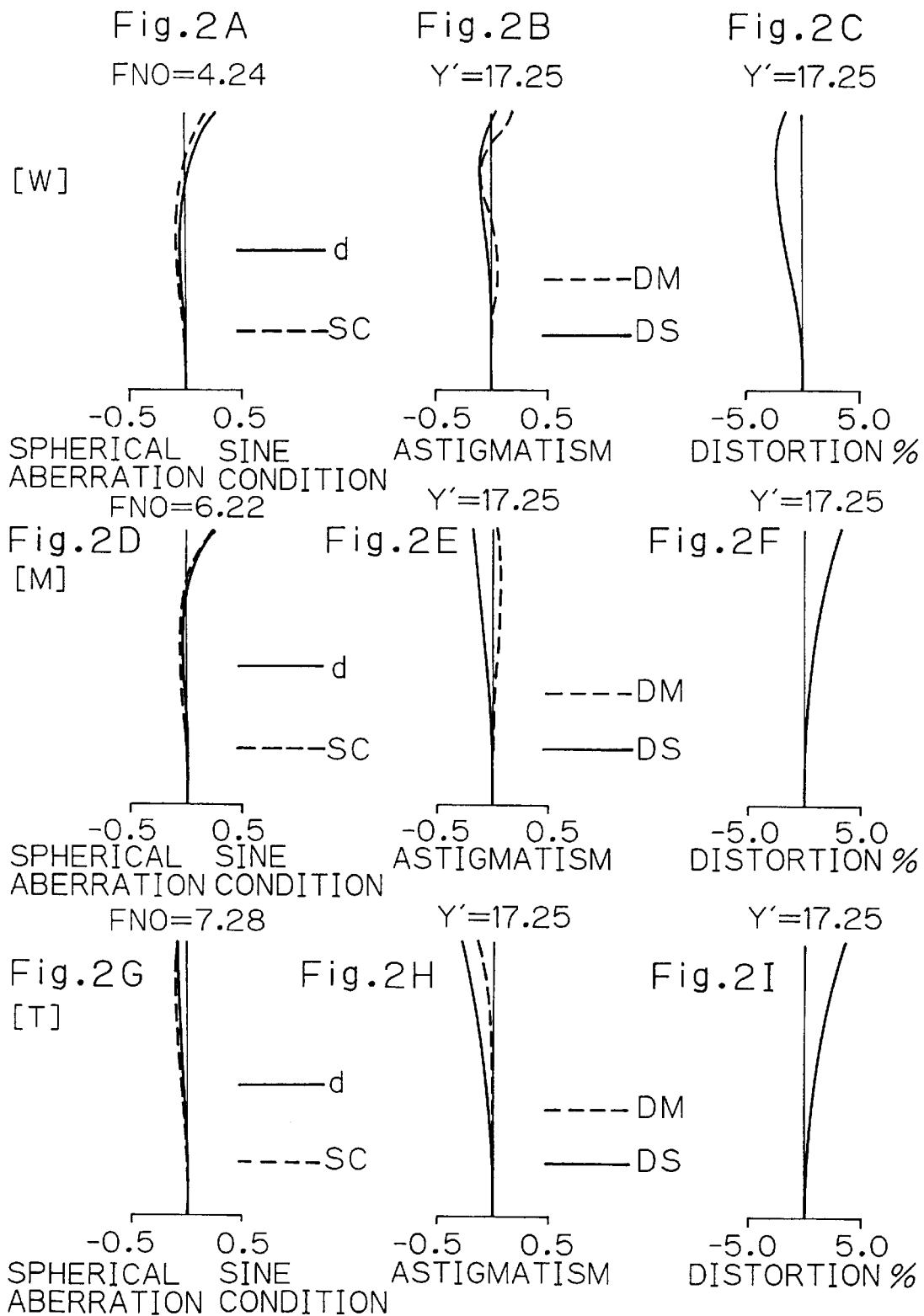

Fig.3A  Y'=12
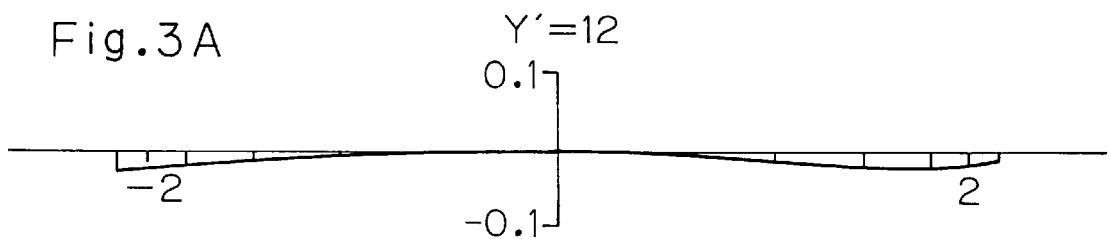
Fig.3B  Y'=0
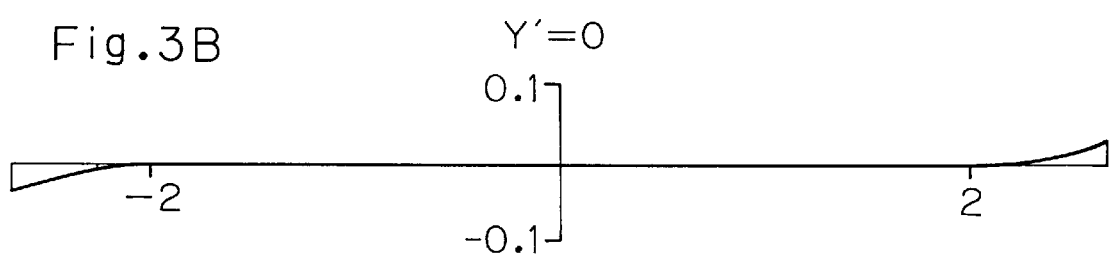
Fig.3C  Y'=-12
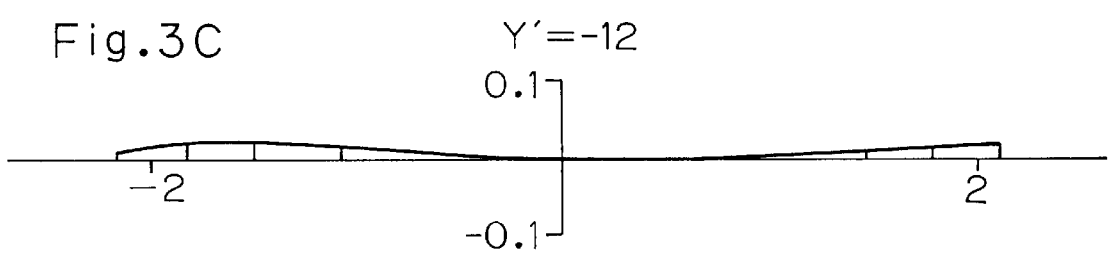
Fig.3D  Y'=12
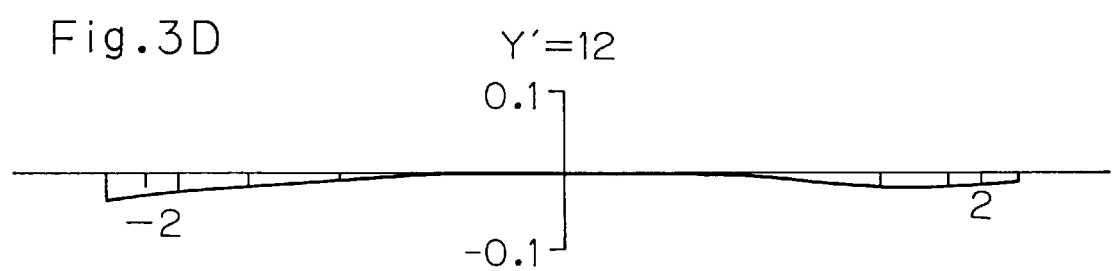
Fig.3E  Y'=0
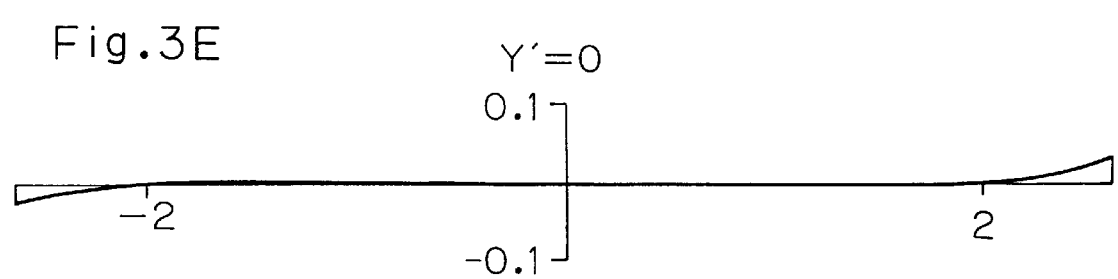

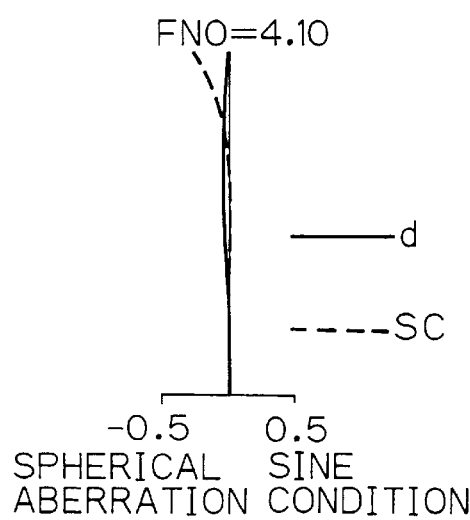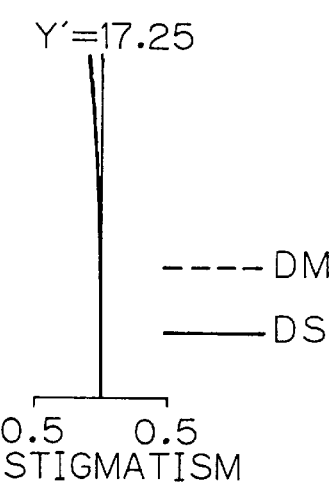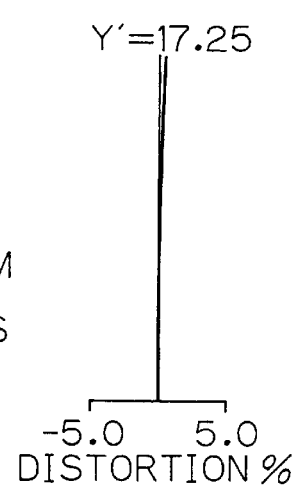

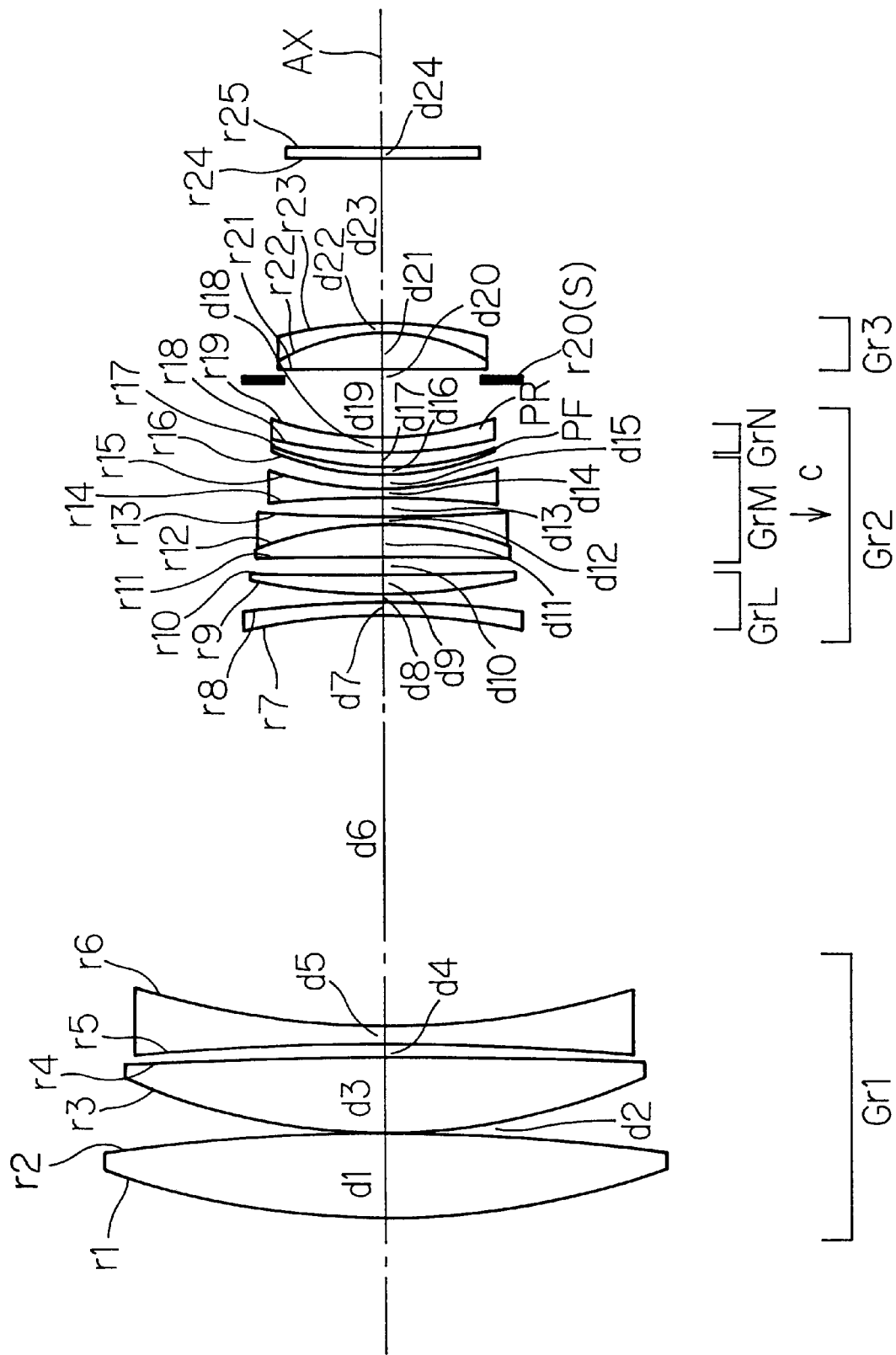

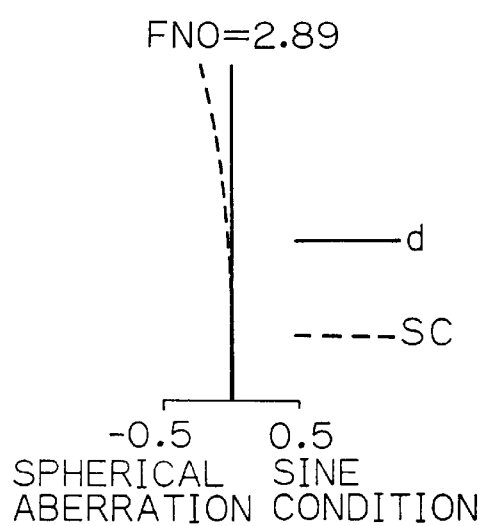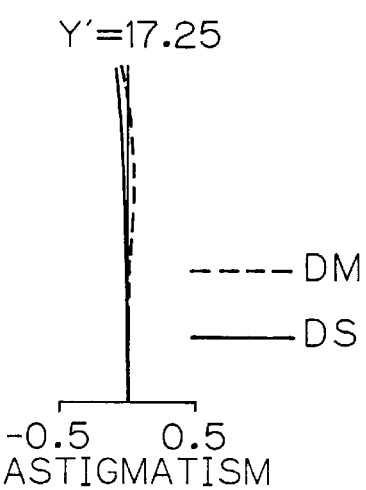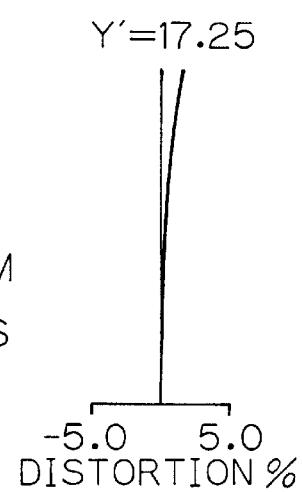

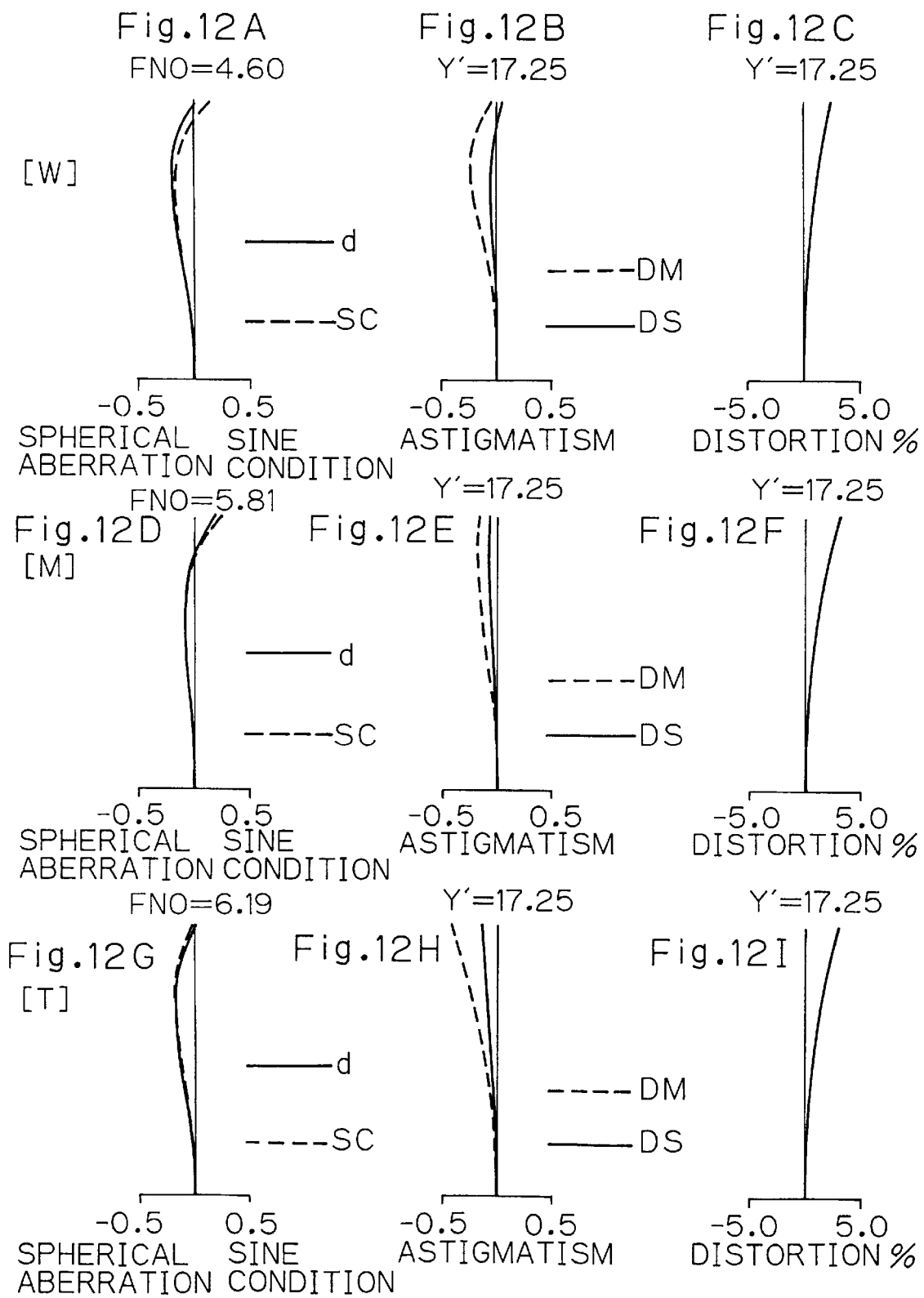

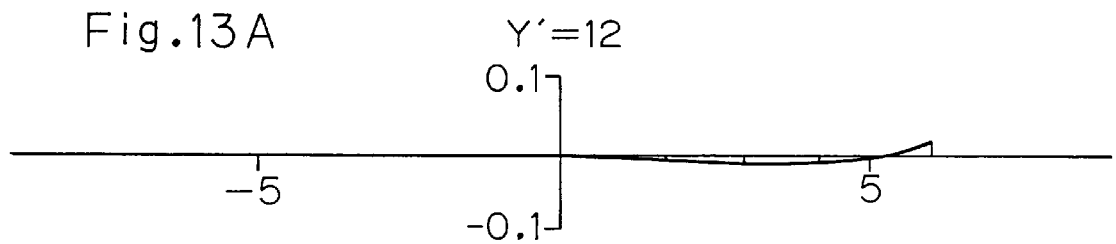
Fig.13A  Y'=12
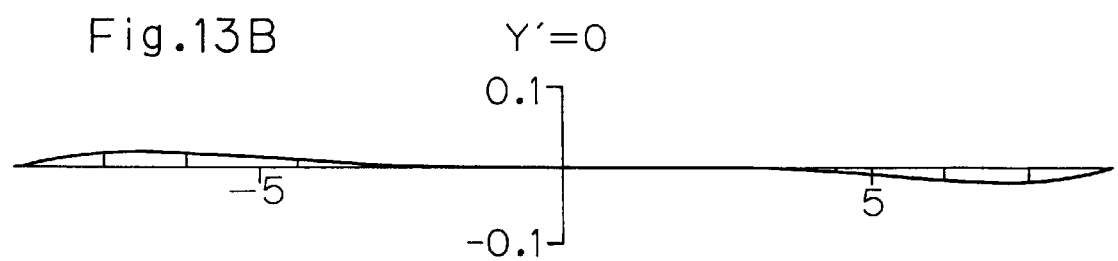
Fig.13B  Y'=0
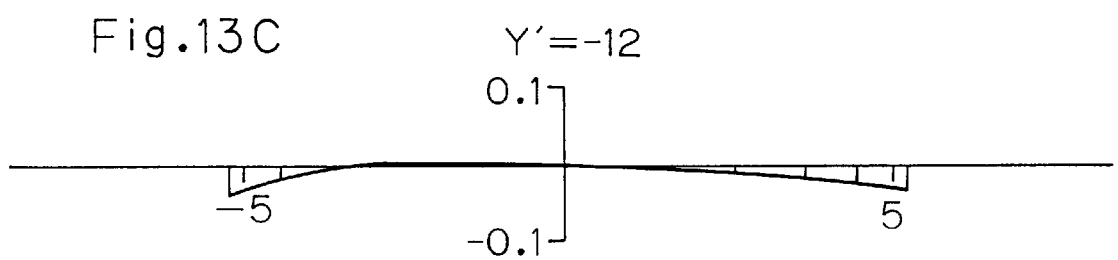
Fig.13C  Y'=-12
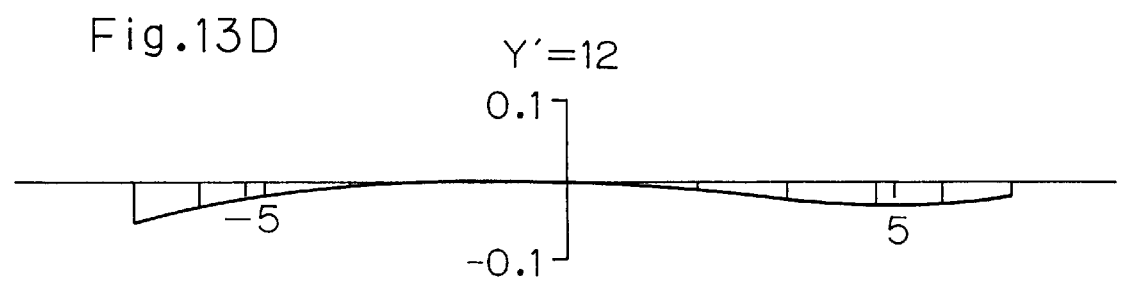
Fig.13D  Y'=12
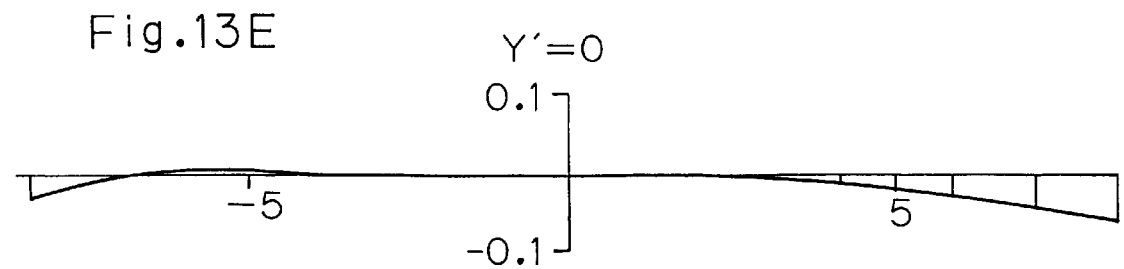
Fig.13E  Y'=0

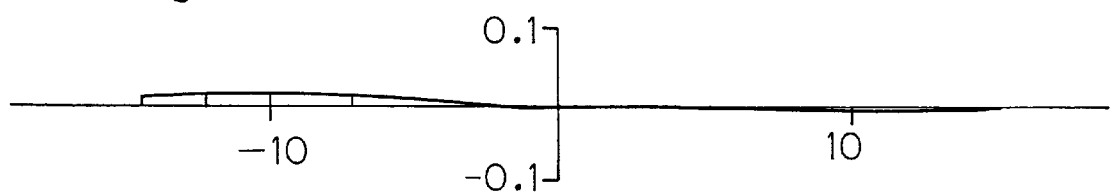
Fig.14A   Y'=12
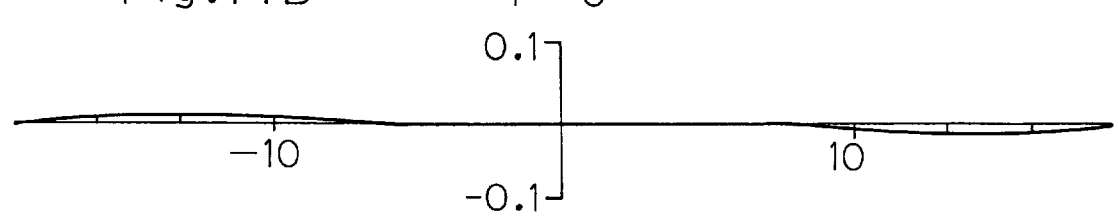
Fig.14B   Y'=0
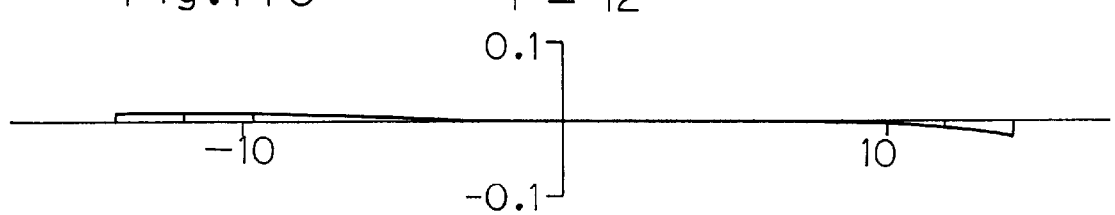
Fig.14C   Y'=-12
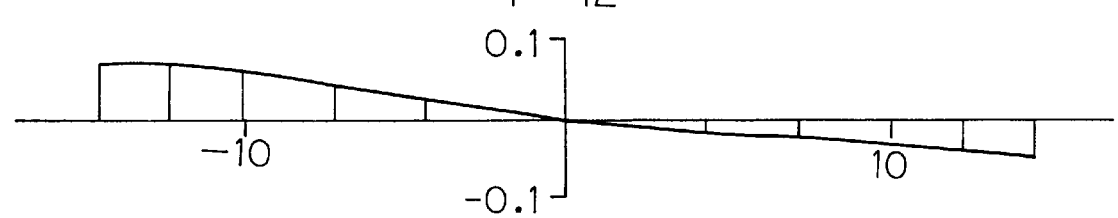
Fig.14D   Y'=12
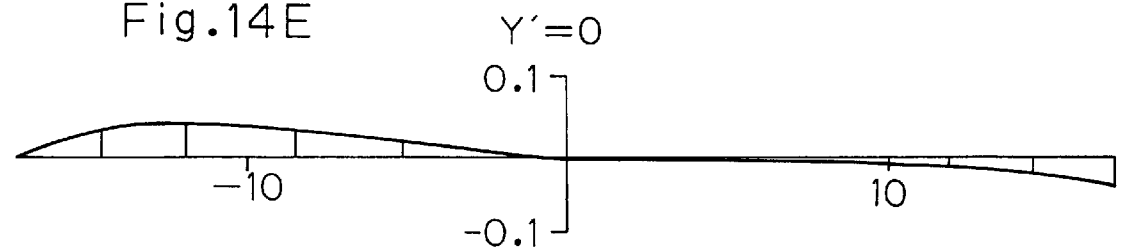
Fig.14E   Y'=0

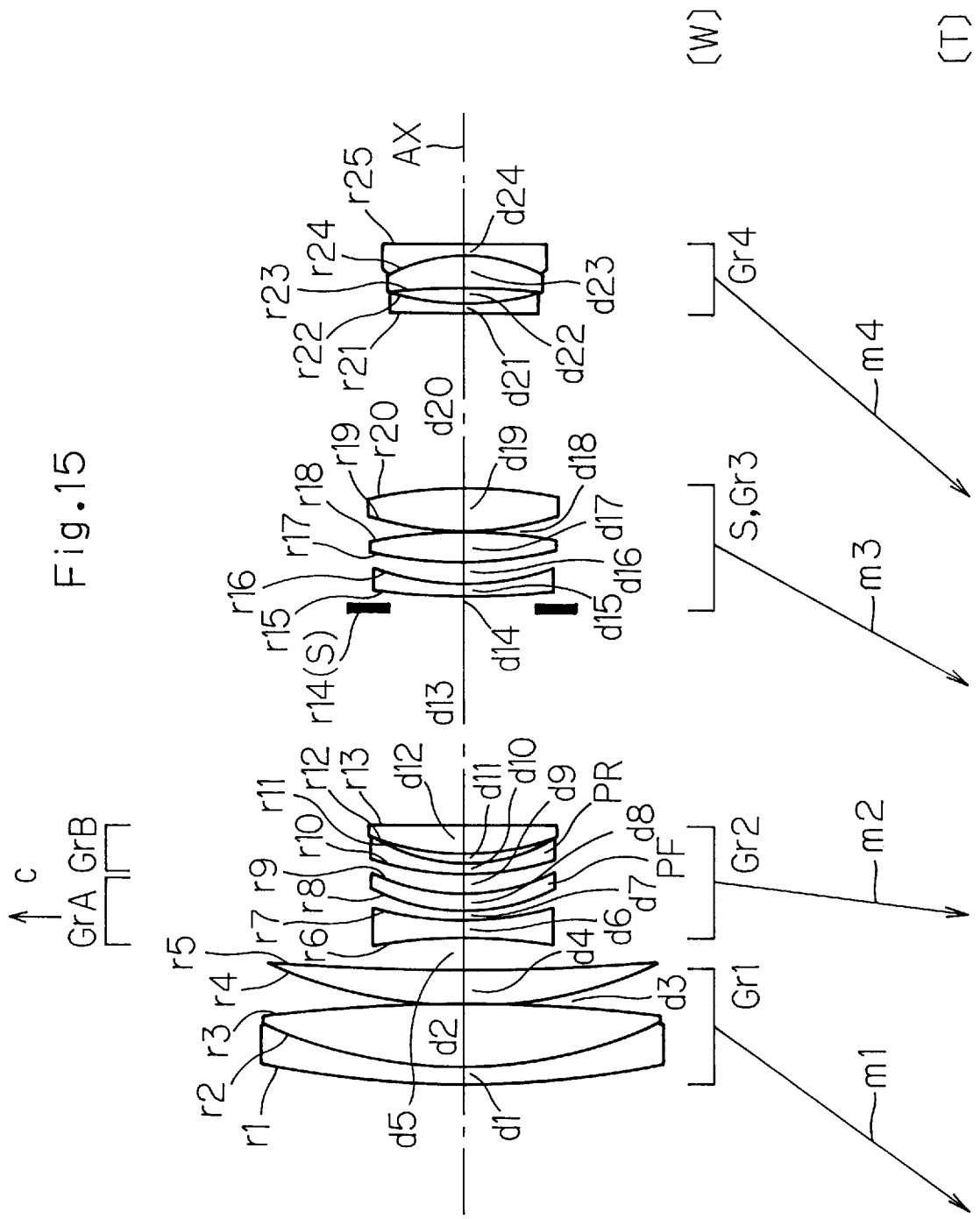

Fig.16A  Fig.16B  Fig.16C
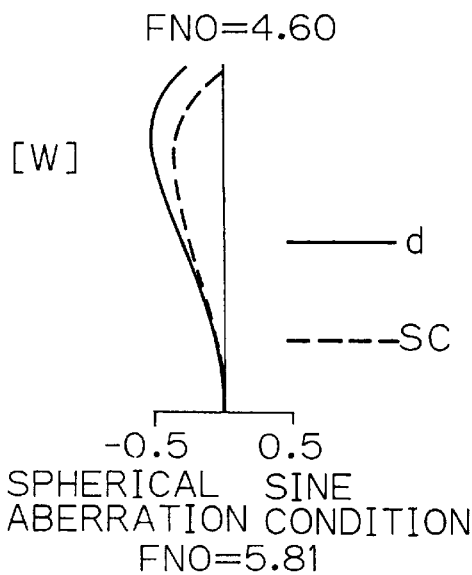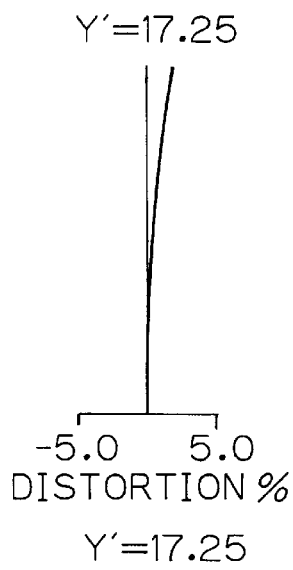
Fig.16D  Fig.16E  Fig.16F
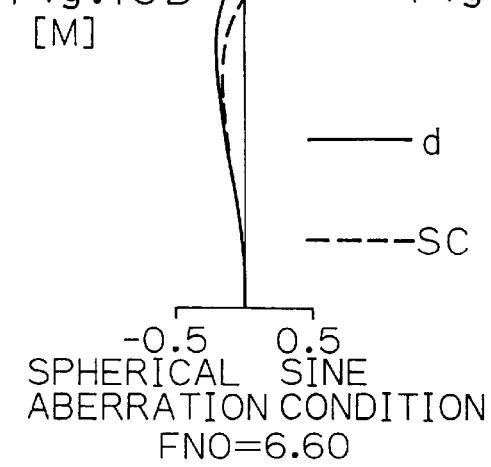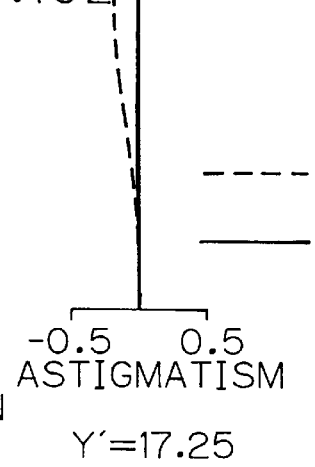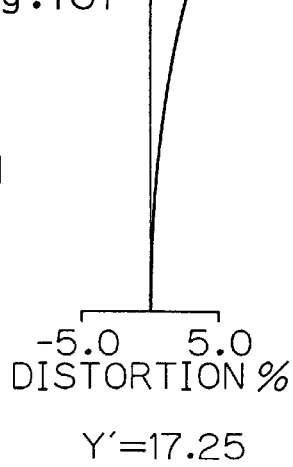
Fig.16G  Fig.16H  Fig.16I
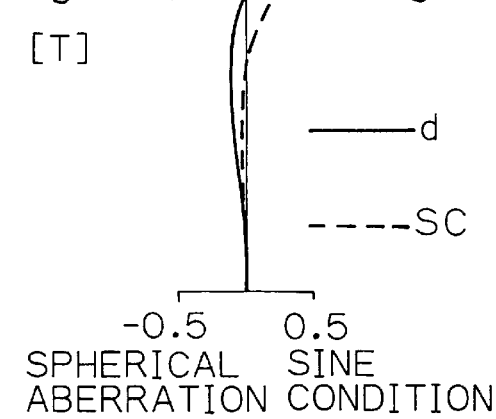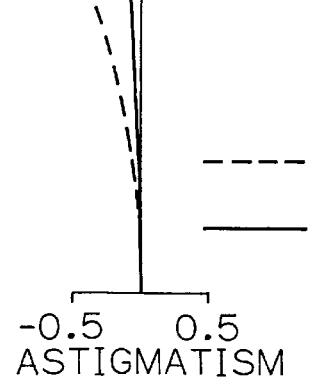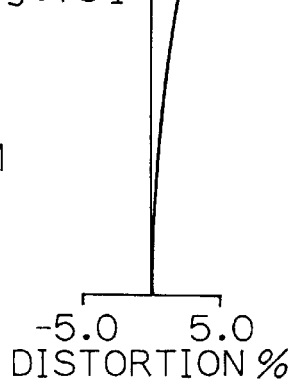

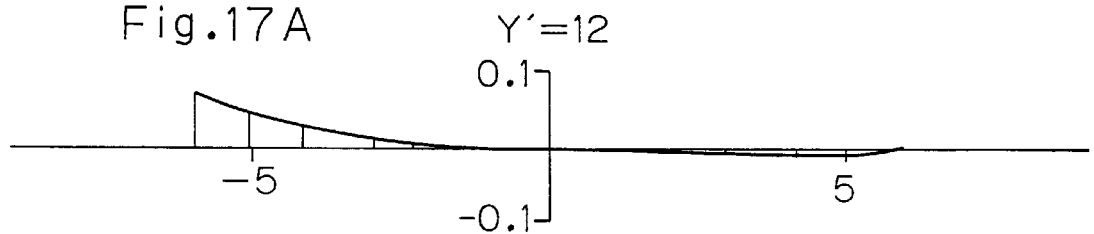
Fig.17A  Y'=12
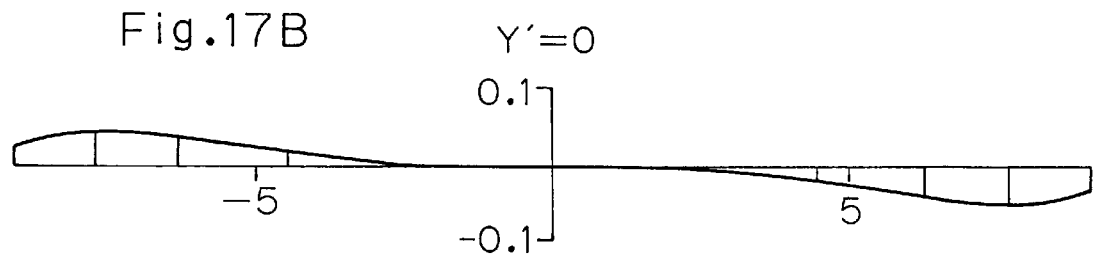
Fig.17B  Y'=0
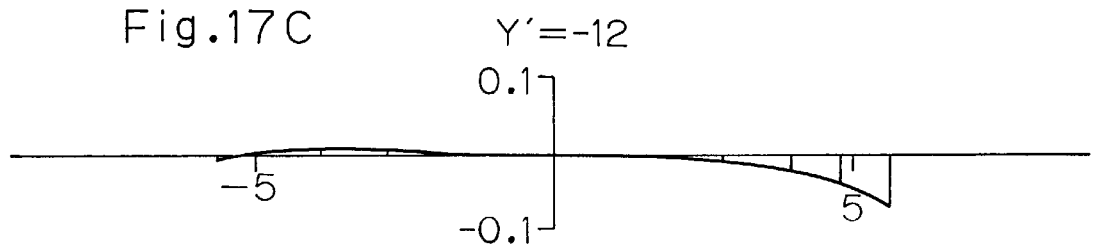
Fig.17C  Y'=-12
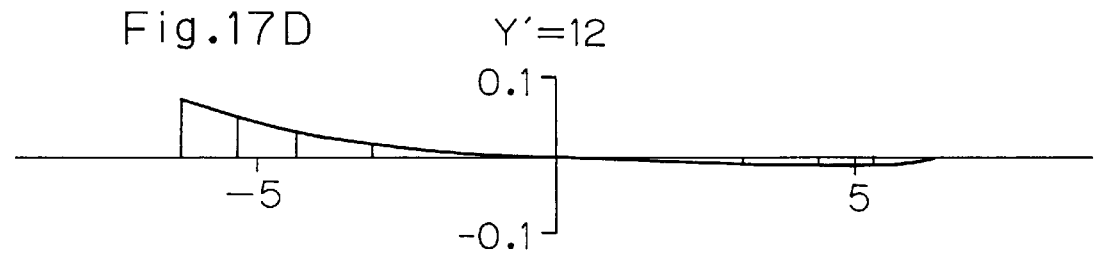
Fig.17D  Y'=12
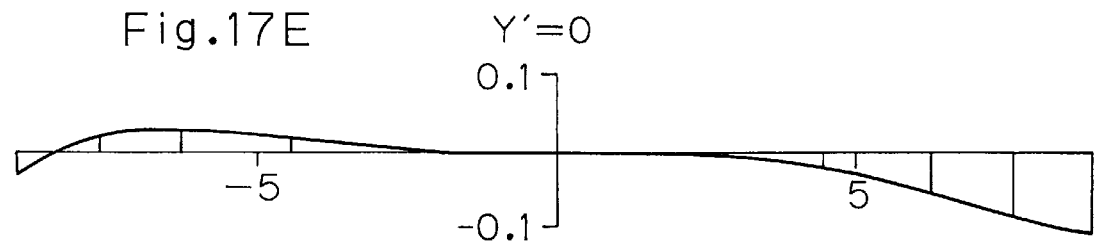
Fig.17E  Y'=0

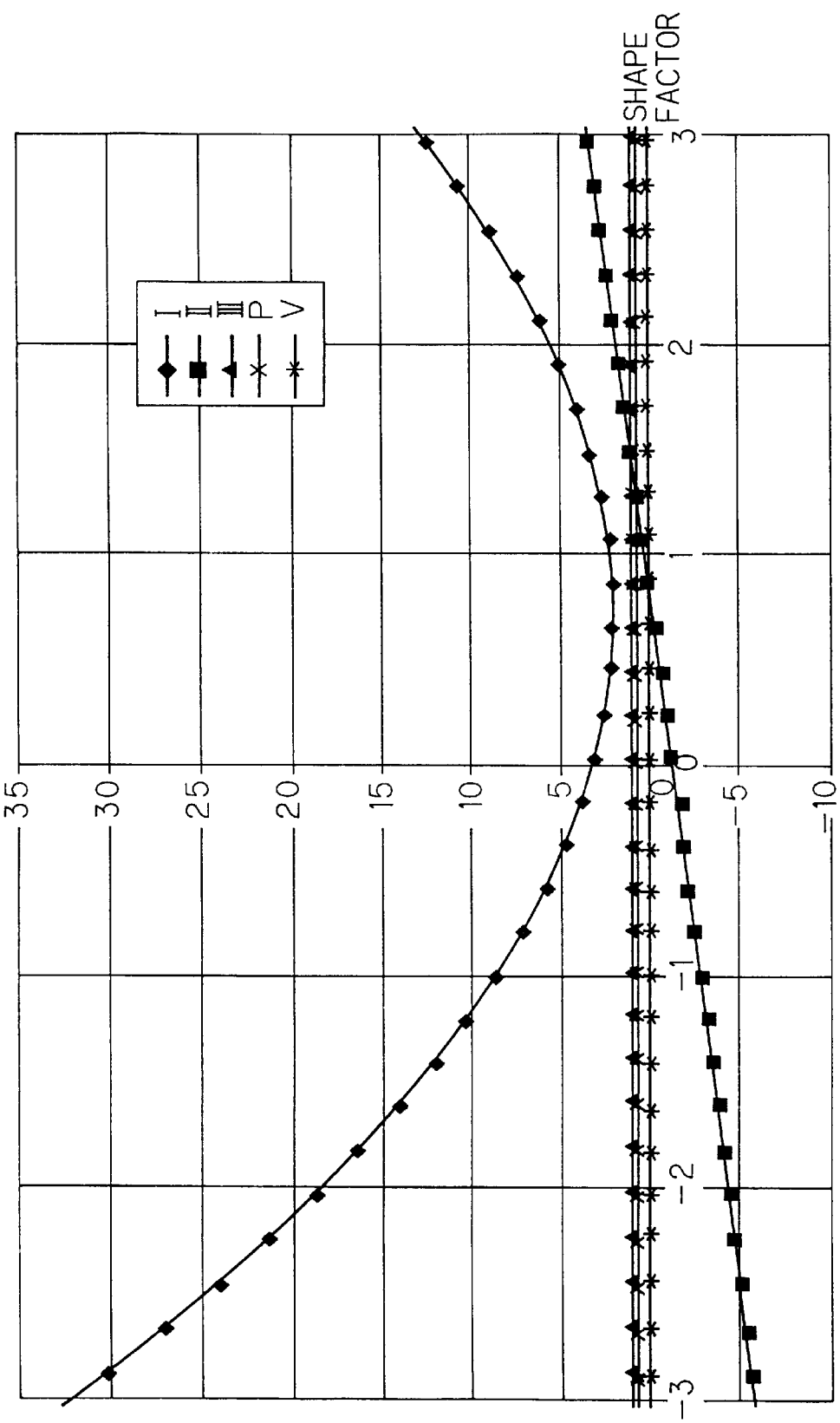

LENS SYSTEM WITH IMAGE BLUR CORRECTION

BACKGROUND OF THE INVENTION

1. Field of the Invention

The present invention relates to an optical system or zoom lens system having a function for correcting an image blur caused by vibration of the optical system. More particularly, the present invention relates to an optical system, such as a zoom lens system or single-focal-length lens system, that is capable of preventing the blurring of an image due to vibration (hereinafter referred to as hand shakes) of the optical system such as occurs when shooting is performed with a camera held by hand.

2. Description of the Prior Art

Conventionally, typical causes of unsuccessful photographing have been hand shakes and improper focusing. However, since most cameras are nowadays equipped with an autofocus mechanism, and since the focusing accuracy of such autofocus mechanisms has been steadily improving, unsuccessful photographing is caused by improper focusing far less often now than before. On the other hand, as more and more cameras are equipped with a zoom lens, rather than with a single-focal-length lens, they are designed to have higher magnifications and to be more suitable for telephoto photography, and accordingly they are now more susceptible to hand shakes. As a result, it can safely be said that, today, unsuccessful photographing is caused exclusively by hand shakes. For this reason, a hand-shake correction function is indispensable in photographing optical systems.

As optical systems having a hand-shake correction function, such optical systems have been proposed in which part of their lens units are decentered for hand-shake correction. For example, U.S. Pat. No. 5,502,594 proposes a telephoto zoom lens system consisting of, from an object side, a first lens unit having a positive refractive power, a second lens unit having a negative refractive power, a third lens unit having a negative refractive power, a fourth lens unit having a positive refractive power, and a fifth lens unit having a negative refractive power, wherein the third lens unit is decentered in a direction perpendicular to the optical system to achieve hand-shake correction.

In an optical system having a hand-shake correction function, it is required that the optical system offer satisfactory optical performance not only in its normal state (hereinafter also referred to as the pre-decentering state), but also in its hand-shake correction state (hereinafter also referred to as the post-decentering state), without causing unduly large aberrations (hereinafter also referred to as the decentering aberrations) as the result of the decentering of the lenses. However, the above-mentioned five-unit zoom lens system according to U.S. Pat. No. 5,502,594 is defective in that it does not offer satisfactory aberration characteristics in the hand-shake correction state (i.e. after decentering) when it corrects hand shakes of large angles. The hand-shake correction performance of this zoom lens system is evaluated, in its publication, with hand shakes of approximately 0.15°. However, while it is often necessary to correct hand shakes of larger angles in actual shooting of night scenes or other with the camera held by hand, this zoom lens system inconveniently exhibits intolerably large aberrations with hand shakes of large angles.

SUMMARY OF THE INVENTION

An object of the present invention is to provide an optical system that has a hand-shake correction function and that is still capable of correcting various aberrations satisfactorily both in its normal state and in its hand-shake correction state.

To achieve the above object, according to one aspect of the present invention, an optical system having a hand-shake correction function is provided with a hand-shake correction lens unit that is decentered in a direction perpendicular to the optical axis for hand-shake correction, and a fixed lens unit that is disposed on the image side of the hand-shake correction lens unit and that is kept in a fixed position during hand-shake correction.

Moreover, this optical system satisfies conditions (1), (2), and (4), or conditions (1), (3), and (4) below. Here, the lens element disposed at the image-side end of the above-mentioned hand-shake correction lens unit is represented by PF, and the lens element that is disposed next to the image-side surface of the lens element PF and that is kept in a fixed position during hand-shake correction is represented by PR.

$$5 < S(PR)/S(PF) < 0 \quad (1)$$

$$1.0 < S(PF) \quad (2)$$

$$S(PF) < 0 \quad (3)$$

$$P(PR)/P(PF) < 0 \quad (4)$$

where

S(PF): shape factor of the lens element PF;
S(PR): shape factor of the lens element PR;
P(PF): refractive power of the lens element PF;
P(PR): refractive power of the lens element PR; and the shape factor is defined as follows:

$$SF = (CRR + CRF)/(CRR - CRF); \quad (A)$$

where

SF: shape factor of a lens element;
CRF: radius of curvature of the object-side surface of the lens element;
CRR: radius of curvature of the image-side surface of the lens element.

According to another aspect of the present invention, a zoom lens system having a hand-shake correction function consists of a plurality of zoom lens units and performs zooming by varying the distances between the zoom lens units. Moreover, in this zoom lens system, one zoom lens unit includes a hand-shake correction lens unit that is decentered in a direction perpendicular to the optical axis for hand-shake correction, and a fixed lens unit that is disposed on the image side of the hand-shake correction lens unit and that is kept in a fixed position during hand-shake correction.

Furthermore, this zoom lens system satisfies conditions (1), (2), and (4), or conditions (1), (3), and (4) above. Here, the lens element disposed at the image-side end of the above-mentioned hand-shake correction lens unit is represented by PF, and the lens element that is disposed next to the image-side surface of the lens element PF and that is kept in a fixed position during hand-shake correction is represented by PR.

As described above, according to the present invention, hand-shake correction is achieved by decentering the hand-shake correction lens unit in a direction perpendicular to the optical axis (that is, by decentering it translationally). As can be seen from the aberration coefficients (described in detail later) that are defined for an optical system having a hand-shake correction function, it is possible, by carefully designing the spherical aberration coefficient of the hand-shake correction lens unit, to correct axial coma aberrations, which is one type of aberrations that occur during hand-shake correction (that is, decentering aberrations). In other words, by disposing a lens element having an appropriate spherical aberration coefficient in the hand-shake correction lens unit, it is possible to correct the axial coma aberrations that occur during hand-shake correction. However, the presence of such a lens element in the hand-shake correction lens unit adversely affects the balance of aberrations in the normal state, increasing in particular spherical aberrations greatly.

To avoid this, according to the present invention, the lens element PF that is disposed at the image-side end of the hand-shake correction lens unit is chosen as the one that is designed to have an appropriate spherical aberration coefficient. Moreover, the lens element PR that is kept in a fixed position during hand-shake correction is disposed next to the image-side surface of the lens element PF. Accordingly, the effects that the lens element PF has on aberrations in the normal state are canceled out by the effects that the lens element PR has on them. Moreover, since the lens element PR is disposed on the image side of the hand-shake correction lens unit that is decentered for hand-shake correction, the lens element PR does not affect aberrations during hand-shake correction. As a result, not only the decentering aberrations that occur in the hand-shake correction state can be corrected properly on the one hand, but also the aberrations over the entire system in the normal state can be kept within a tolerable range on the other hand.

FIGS. 19 and 20 show the relationship between the shape factor SF and the aberration coefficients I, II, III, P, V in the case where light from infinity is incident on a single lens element. From these figures, it is understood that a positive lens element has a positive spherical aberration coefficient I and a negative lens element has a negative spherical aberration coefficient I, and also that the value of the spherical aberration coefficient varies greatly with the shape factor. It is further understood that the coma aberration coefficient II also varies with the shape factor, and especially that it even changes its sign. It is for these reasons that, in order to enable the lens elements PF and PR to cancel out the spherical and other aberrations originating from themselves, they are designed to have opposite refractive powers and to satisfy a combination of previously noted conditions (1), (2), and (4), or conditions (1), (3), and (4).

Condition (1) defines the ratio of the shape factors of the lens elements PF and PR. If the upper or lower limit of condition (1) is exceeded, the differences in the spherical aberration coefficient I and the coma aberration coefficient II between the lens elements PF and PR are so large that it is not possible to cancel out the aberrations between them. This makes it difficult to correct properly the aberrations, in particular spherical and coma aberrations, in the normal state.

Alternatively, to obtain better optical performance in the normal state, it is preferable that the lens elements PF and PR satisfy condition (1a) below:

$$-1.5 < S(PR)/S(PF) < -0.2 \quad (1a)$$

Conditions (2) and (3) define the shape factor of the lens element PF. If the lower limit of condition (2) or the upper limit of condition (3) is exceeded, the absolute value of the spherical aberration coefficient I of the lens element PF is so small, as is clear from FIGS. 19 and 20, that it is difficult to correct properly the axial coma aberrations that occur during hand-shake correction.

Alternatively, to further reduce the aberrations that occur during hand-shake correction, it is preferable that the lens element PF satisfy condition (2a) or (3a) below:

$$2.2 < S(PF) \quad (2a)$$

$$S(PF) < -0.7 \quad (3a)$$

Condition (4) defines the ratio of the refractive powers of the lens elements PF and PR. As with condition (1), if the upper limit of condition (4) is exceeded, the difference in the spherical aberration coefficient I between the lens elements PF and PR is so large that it not possible to cancel out the aberrations between them.

Moreover, it is preferable that the lens element PR satisfy conditions (5) and (7), or conditions (6) and (7) below:

$$1.0 < S(PR) \quad (5)$$

$$S(PR) < 0 \quad (6)$$

$$0.1 < |P(PR)|/P < 2.5 \quad (7)$$

where

P: refractive power of the entire system.

Conditions (5) and (6) define the shape factor of the lens element PR. If the lower limit of condition (5) or the upper limit of condition (6) is exceeded, the spherical aberration coefficient I of the lens element PR is so small that it is difficult to correct properly the axial coma aberrations that occur during hand-shake correction.

Alternatively, to further reduce the aberrations that occur during hand-shake correction, it is preferable that the lens element PR satisfy condition (5a) or (6a) below:

$$2.2 < S(PR) \quad (5a)$$

$$S(PR) < -0.7 \quad (6a)$$

Condition (7) defines the refractive power of the lens element PR. If the lower limit of condition (7) is exceeded, the refractive power of the lens element PR is so weak that, in order to obtain a large enough spherical aberration coefficient I, it is necessary to make the shape factor very large. This requires that the radius of curvature of the lens element PR be extremely small, and it is impossible to manufacture such a lens element by any existing method. In contrast, if the upper limit of condition (7) is exceeded, the refractive power of the lens element PR is so strong that it is difficult to correct properly the large aberrations that occur in the lens element PR.

Alternatively, to obtain better optical performance, it is preferable that the lens element PR satisfy condition (7a) below:

$$0.1 < |P(PR)|/P < 1.0 \quad (7a)$$

For the same reasons as stated above in connection with condition (7), it is preferable that the lens element PF, too, satisfy condition (8) below:

$$0.1 < |P(PF)L|/P < 2.5 \quad (8)$$

Alternatively, to obtain better optical performance, it is preferable that the lens element PF satisfy condition (8a) below:

$$0.1 < |P(PF)L|/P < 1.0 \quad (8a)$$

To cancel out the spherical aberrations between the lens elements PF and PR, it is necessary that these two lens elements cause approximately the same degree of spherical aberrations. To achieve this, it is preferable that the lens elements PF and PR satisfy condition (9) below:

$$0.003 < d(PF, PR)*P < 0.1 \quad (9)$$

where d(PF, PR): axial distance between the first and second lens elements L1 and L2.

Condition (9) defines the axial distance between the lens elements PF and PR (that is, the axial distance between the image-side surface of the lens element PF and the object-side surface of the lens element PR). If the upper limit of condition (9) is exceeded, the distance between the lens elements PF and PR is so large that light beams pass through quite different points between when passing through the lens element PF and when passing through the lens element PR. This makes it difficult to cancel out the spherical and coma aberrations simultaneously. If the lower limit of condition (9) is exceeded, the lens elements PF and PR are so close to each other that they collide when the hand-shake correction lens unit is decentered translationally during hand-shake correction.

In general, in a zoom photographing optical system for use in a single-lens reflex camera, the first lens unit is the largest of all the lens units, and therefore the lens elements constituting it are considerably heavy. Accordingly, it is not preferable to perform hand-shake correction by moving the lens elements of the first lens unit in a direction perpendicular to the optical axis (that is, by decentering them translationally), because such a construction requires a larger mechanism for driving the hand shake-correction lens unit. For this reason, it is preferable to arrange the hand-shake correction lens unit in a zoom lens unit other than the first lens unit.

Since the above-mentioned lens element PF is moved for hand-shake correction, it needs to be light enough to minimize the load to be borne by the hand-shake correction lens unit driving mechanism. Accordingly, it is preferable that the lens element PF be a plastic lens. The use of a plastic lens here not only minimizes, because of its light weight, the load to be borne by the hand-shake correction lens unit driving mechanism, but also offers the advantage of reducing the cost. Moreover, it is preferable that also the above-mentioned lens element PR be a plastic lens, the use of which offers the advantage of reducing the cost.

Ideally, the movement amount by which the hand-shake correction lens unit is moved for hand-shake correction (hereinafter referred to as the hand-shake correction movement amount) needs to be approximately the same between at the wide-angle end and at the telephoto end of the zoom range. Accordingly, it is preferable that the optical system according to the present invention further satisfy condition (10) below:

$$0.4 < MT/MW < 2.5 \quad (10)$$

where

MT: movement amount of the hand-shake correction lens units, at the telephoto end;

MW: movement amount of the hand-shake correction lens units, at the wide-angle end.

If the upper or lower limit of condition (10) is exceeded, the difference between the hand-shake correction movement amounts at the wide-angle and telephoto ends of the zoom range is too large. This makes it impossible to calculate the hand-shake correction amount at an arbitrary focal length without considerable calculation errors.

When the hand-shake correction lens unit is translationally decentered for hand-shake correction, there occur axial lateral chromatic aberrations, which are one type of the decentering aberrations. To reduce such aberrations, the hand-shake correction lens unit itself needs to be capable of correcting chromatic aberrations that occur in itself. Accordingly, it is preferable that the hand-shake correction lens unit satisfy condition (11) below:

$$vp > vn \quad (11)$$

where vp: Abbe number of the positive lens elements in the hand-shake correction lens units;

vn: Abbe number of the negative lens elements in the hand-shake correction lens units.

When, in the hand-shake correction state (that is, in the post-decentering state), the hand-shake correction lens unit is moved in a direction perpendicular to the optical axis for hand-shake correction, light beams pass through a portion through which they never pass in the normal state (that is, in the pre-decentering state). In such a situation, light beams become stray light beams, and may degenerate the imaging performance of the optical system. To avoid this, and thereby to maintain satisfactory imaging performance even in the hand-shake correction state, it is preferable that a fixed aperture diaphragm be provided on the object side of the hand-shake correction lens unit, or within the hand-shake correction lens unit, or on the image side of the hand-shake correction lens unit.

<<Decentering Aberrations and Decentering Aberration Coefficients>>

Next, with reference to FIGS. 21A to 21D, descriptions and definitions will be given as to various types of decentering aberrations that occur in an optical system having a hand-shake correction function (hereinafter referred to as a hand-shake correction optical system) such as a zoom lens system according to the present invention. All types of the decentering aberrations shown in FIGS. 21A to 21D (off-axial image-point movement errors, one-side blur, axial coma, and axial lateral chromatic aberrations) degrade imaging performance of a hand-shake correction optical system.

[Off-axial image-point movement errors] {FIG. 21A}

In a decentered optical system, in addition to normal distortion, additional distortion occurs as the result of the decentering. For this reason, in a hand-shake correction optical system, if a hand shake is corrected in such a way that axial image points (that is, image points at the center of the image area) are brought to a rest, off-axial image points do not stop completely, and thus cause an image blur. In FIG. 21A, reference numeral 1 represents a film surface, reference numeral 2 represents image points in the hand-shake correction state (post-decentering state), reference numeral 3 represents image points in the normal state (pre-decentering state), and reference numeral 4 indicates the direction in which a hand shake is corrected.

Here, assume that the optical axis is the X axis, and the direction of a hand shake is the Y axis (thus, the hand shake is corrected in the Y-axis direction). Further, let Y(y', z', θ') be the actual Y coordinate, at a hand-shake correction angle θ, of a light beam with a paraxial image point at (y', z') (note that y(0, 0, θ)=0 in any case, since correction is performed such that axial image points are brought to a rest). Then, expression (a) below holds.

$$\Delta Y(Y', Z', \theta) = Y(Y', Z', \theta) - Y(Y', z', 0) \quad (a)$$

Unless otherwise specified, the off-axial image-point movement error $\Delta Y_{Y'}$ of an image point on the Y axis and the off-axial image-point movement error $\Delta Y_z'$ of an image point on the Z axis are respectively represented by expressions (b) and (c) below. Here, 0.7field is approximately 12 mm for new-generation 24 mm film.

$$\Delta Y_{Y'-\{\Delta Y\}}(0.7\text{field}, 0, 0.7°)+\Delta Y(-0.7\text{field}, 0, 0.7°)\}/2 \quad (b)$$

$$\Delta Y_{z'-\Delta Y}(0, 0.7\text{field}, 0.7°) \quad (c)$$

[One-side blur] {FIG. 21B}

In FIG. 21B, reference numeral 5 represents an image plane that is asymmetrical with respect to the optical axis AX, and 6 represents an image plane that is symmetrical with respect to the optical axis AX. When an optical system is asymmetrical, the image plane 5 is asymmetrical with respect to the optical axis AX. In such a case, a meridional one-side blur $\Delta M'$ and a sagittal one-side blur $\Delta S'$ occur, which are respectively represented by expressions (d) and (e) below.

$$\Delta M'=\{\text{meridional value}(y'=0.7\text{field}, z=0, \theta=0.7°)-\text{meridional value}(y'=-0.7\text{field}, z=0, \theta=0.7+)\}/2 \quad (d)$$

$$\Delta S'=\{\text{sagittal value}(y'=0.7\text{field}, z=0, \theta=0.7°)-\text{sagittal value}(y'=-0.7\text{field}, z=0, \theta=0.7°)\}/2 \quad (e)$$

[Axial coma] {FIG. 21C}

In FIG. 21C, reference numeral 7 represents an axial light beam, and 8 represents an axial principal light ray. As shown in the figure, when the axial light beam 7 is not symmetrical with respect to the axial principal light ray 8, coma occurs. The axial coma AXCM developed in the axial light beam 7 is represented by expression (f) below.

$$AXCM=\{Y(\text{upper zonal}, \theta=0.7°)+Y(\text{lower zonal}, \theta=0.7°)\}/2 \quad (f)$$

[Axial lateral chromatic aberration] {FIG. 21D}

Since the position in which a light ray forms its image point varies with its wavelength, even an axial light ray exhibits deviation of the image point in an asymmetrical optical system. For an axial principal light ray, the axial lateral chromatic aberration is represented by expression (g) below.

$$(\text{Axial Lateral Chromatic Aberration})=\{Y(\text{g-lines}, \theta=0.7°)-Y(\text{d-lines}, \theta=0.7°)\} \quad (g)$$

In connection with the decentering aberration coefficients defined above, their applications are discussed in a thesis by Yoshiya Matsui, titled "On the Third-degree Aberrations in Optical Systems Involving Decentering" (JOEM, June, 1990). The method presented there is however intended to be applied to such a situation where an ordinary taking lens is decentered as a result of improper assembly, and therefore it cannot be applied directly to a hand-shake correction optical system, where the co-axial relationship among the object plane, taking lens, and image plane is intentionally broken. To make it possible to apply the method presented in the above-mentioned thesis to a hand-shake correction optical system, it is necessary to express the aberrations that actually occur in the hand-shake correction optical system as aberration coefficients of the third degree, with the help of the transformation formulae and techniques described hereinafter

[Application of the decentering aberration coefficients to a hand-shake correction optical system]

With reference to FIG. 22, which defines the relationship between the optical system and a coordinate system, the methods for calculating the decentering aberration coefficients will be described. First of all, the following expressions hold:

$$\tan\omega \cdot \cos\phi\omega = \frac{Y}{g\$}$$

$$\tan\omega \cdot \sin\phi\omega = \frac{Z}{g\$}$$

$$R \cdot \cos\phi R = \frac{g\$}{g} \cdot Y^*$$

$$R \cdot \sin\phi R = \frac{g\$}{g} \cdot Z^*$$

where g represents the distance from the entrance-pupil plane to the object plane (object surface) OS, g$ represents the distance from the object-side principal plane to the object plane OS, $\Omega$ represents the angle of the straight line from the object point to the object-side principal point H with respect to the reference axis of the optical system, $\phi\Omega$ is its azimuth, R represents the radius of the entrance pupil as seen on the object-side principal plane, and $\phi R$ is its azimuth.

When the v-th surface from the object side is decentered translationally a slight distance Ev in the Y direction with respect to the reference axis, the image-point movement amounts $\Delta Y$ and $\Delta Z$ on the image plane (image surface) IS are represented by expressions (1A) and (1B) below.

$$\Delta Y = -(Ev/2\alpha_k') \cdot [(\Delta E)v + (N \cdot \tan\omega)^2 \cdot \{(2 + \cos2\phi\omega) \cdot (VE1)v - (VE2)v\} + 2R \cdot (N \cdot \tan\omega) \cdot \{(2\cos(\phi R - \phi\omega) + \cos(\phi R + \phi\omega)) \cdot (IIIE)v + \cos\phi R \cdot \cos\phi\omega \cdot (PE)v\} + R^2 \cdot (2 + \cos2\phi R) \cdot (IIE)v] \quad (1A)$$

$$\Delta Z = -(Ev/2\alpha_k') \cdot [(N \cdot \tan\omega)^2 \cdot \sin2\phi\omega \cdot (VE1)v + 2R \cdot (N \cdot \tan\omega) \cdot \{\sin(\phi R + \phi\omega) \cdot (IIIE)v + \sin\phi R \cdot \sin\phi\omega \cdot (PE)v\} + R^2 \cdot \sin2\phi R \cdot (IIE)v] \quad (1B)$$

Here, if it is assumed that ($\Delta E$)v: prismatic effect (lateral deviation of the image), (VE1)v, (VE2)v: rotationally asymmetrical distortion, (IIIE)v, (PE)v: rotationally asymmetrical astigmatism and image-plane inclination, (IIE)v: rotationally asymmetrical coma that occurs even with axial light rays, then the decentering aberration coefficients that represent the effects of the decentering are represented, on the basis of the aberration coefficients of the lens surfaces from the vth surface to the image plane, by expressions (1C) to (1H) (here, items followed by # are ones related to the object plane). Note that expressions (1A) to (1H) can be used also in the case of rotational decentering.

$$(\Delta E)v = -2(\alpha v' - \alpha v) \quad (1C)$$

$$(VE1)v = [\{\alpha v' \cdot (\mu = v + 1 \to k)\Sigma V\mu\} - \{\alpha v \cdot (\mu = v \to k)\Sigma V\mu\}] - [\{\alpha v'\# \cdot (\mu = v + 1 \to k)\Sigma III\mu\} - \{\alpha v\# \cdot (\mu = v \to k)\Sigma III\mu\}] \quad (1D)$$

$$(VE2)v = \{\alpha v'\# \cdot (\mu = v + 1 \to k)\Sigma P\mu\} - \{\alpha v\# \cdot (\mu = v \to k)\Sigma P\mu\} \quad (1E)$$

$$(IIIE)v = [\{\alpha v' \cdot (\mu = v + 1 \to k)\Sigma III\mu\} - \{\alpha v \cdot (\mu = v \to k)\Sigma III\mu\}] - [\{\alpha v'\# \cdot (\mu = v + 1 \to k)\Sigma II\mu\} - \{\alpha v\# \cdot (\mu = v \to k)\Sigma II\mu\}] \quad (1F)$$

-continued $$(PE)\nu = \{\alpha\nu' \cdot (\mu = \nu + 1 \to k)\Sigma P\mu\} - \{\alpha\nu \cdot (\mu = \nu \to k)\Sigma P\mu\} \quad (1G)$$

$$(IIE)\nu = [\{\alpha\nu' \cdot (\mu = \nu + 1 \to k)\Sigma II\mu\} - \{\alpha\nu \cdot (\mu = \nu \to k)\Sigma II\mu\}] - \quad (1H)$$
$$[\{\alpha\nu'\# \cdot (\mu = \nu + 1 \to k)\Sigma I\mu\} - \{\alpha\nu\# \cdot (\mu = \nu \to k)\Sigma I\mu\}]$$

However, in applying the decentering aberration coefficients to a hand-shake correction optical system, it is necessary, by reversing the optical system, to replace the image plane IS with the object plane OS in order to obtain aberration coefficients as seen from the image plane IS. That is, the image-point movement amounts need to be converted into those as seen on the object plane OS. The reasons are as follows.

First, there is a difference in how the paths of light rays are affected by the decentering. As shown in FIG. 23A (here, $L_1$ represents a light ray in a normal state without decentering, and $L_2$ represents the same light ray in a decentered state), the method described in the above-mentioned thesis by Y. Matsui deals only with such cases in which it is between the decentered lens LS and the image plane IS that the paths of light rays are affected by the decentered lens LS. In such cases, the decentering aberration coefficients depend on the aberration coefficients of the decentered lens LS and of the lenses disposed between the decentered lens LS and the image plane IS. In contrast, as shown in FIG. 23B (here, $M_1$ represents a light beam before hand-shake correction and $M_2$ represents the same light beam after hand-shake correction), in a hand-shake correction optical system, it is (ideally) on the downstream side of the decentered lens LS that light rays take different paths before and after hand-shake correction. In this case, the decentering aberration coefficients depend on the aberration coefficients of the decentered lens LS and of the lenses disposed on the downstream side of the decentered lens LS.

Second, rotational conversion of the object plane may cause additional aberrations. The method described in the above-mentioned thesis by Y. Matsui assumes that the object plane $OS_1$ and the image plane IS are in fixed positions. However, in a hand-shake correction optical system, the object plane $OS_1$ rotates, as shown in FIG. 24. As a result, the off-axial image-point movement errors and the one-side blur occur in a considerably different manner from in cases where the object plane $OS_1$ does not rotate. In FIG. 24, $OS_1$ represents the object plane before hand-shake correction, and $OS_2$ represents the object plane after hand-shake correction.

[Aberration coefficients of a reversed optical system and aberration coefficients of a non-reversed optical system]

For the reasons stated above, it is necessary to convert the image-point movement amounts into those as seen on the object plane. Specifically, the coefficients defined by expressions (1A) to (1H) above are converted according to expressions (2A) to (2J) below, which hold in a reversed optical system as shown in FIG. 25. Note that, here, $^R(\ )$ indicates a reversed system, and N represents the refractive index.

| | | |
|---|---|---|
| $^R\alpha = {}^RN/{}^Rg\$ = -\alpha'$ | | (2A) |
| $^R\alpha\# = \alpha'\#$ | | (2B) |
| $^R\alpha\mu' = -\alpha\nu$ | | (2C) |
| $^R\alpha\mu'\# = \alpha\nu\#$ | | (2D) |
| $^RP\mu = P\nu$ | <non-reversed> | (2E) |
| $^R\phi\mu = \phi\nu$ | <non-reversed> | (2F) |
| $^RI\mu = I\nu$ | <non-reversed> | (2G) |

-continued

| | | |
|---|---|---|
| $^RII\mu = -II\nu$ | <reversed> | (2H) |
| $^RIII\mu = III\nu$ | <non-reversed> | (2I) |
| $^RV\mu = -V\nu$ | <reversed> | (2J) |

[Decentering aberration coefficients and hand-shake aberration coefficients when a hand-shake correcting lens unit is decentered translationally]

Expressions (1A) to (1H) above assume that only one surface v is decentered. Accordingly, next, expressions (1A) to (1H) need to be further transformed into expressions that can deal with cases where two or more surfaces i~j are decentered. When a hand-shake correction lens unit is decentered translationally, the decentering amounts Ei~Ej of all the decentered surfaces i~j are equal. This means that, in handling the aberration coefficients, it is only necessary to consider their respective sum totals. For example, $$(\Delta E)i\sim j=(\nu=i\to j)\Sigma\{-2\cdot(\alpha\nu'-\alpha\nu)\}$$

Further, from $\alpha\nu'=\alpha\nu+1$, the following expression is obtained:

$$(\Delta E)i\sim j=-2\cdot(\alpha j'-\alpha i)$$

In similar manners, the intermediate terms of $\Sigma$ in the other aberration coefficients can be eliminated. For example, $$(PE)i\sim j=(\mu=i\to j)\Sigma\{\alpha\nu'\cdot(\mu=\nu+1\to k)\Sigma P\mu-\alpha\nu\cdot(\mu=\nu\to k)\Sigma P\mu\}=\alpha j'\cdot(\mu=j+1\to k)\Sigma P\mu-\alpha i\cdot(\mu=i\to k)\Sigma P\mu$$

This is further transformed into $$(PE)i\sim j=(\alpha j'-\alpha i)\cdot(\mu=j+1\to k)\Sigma P\mu-\alpha i\cdot(\mu=i\to j)\Sigma P\mu$$

where ($u=j+1\to k$)$\Sigma P\mu$: sum of P's (Petzval sum) of the lenses disposed on the downstream side of the hand-shake correction lens unit;

($\mu=i\to j$)$\Sigma P\mu$: sum of P's (Petzval sum) of the lenses constituting the hand-shake correction lens unit.

Eventually, the following expression is obtained:

$$(PE)i\sim j=(\alpha j'-\alpha i)P_R-\alpha i\cdot P_D$$

where $(\ )_R$: the sum of the aberration coefficients of the lenses disposed on the downstream side of the hand-shake correction lens unit;

$(\ )_D$: the sum of the aberration coefficients of the lenses constituting the hand-shake correction lens unit.

After necessary conversions as described above, which are performed to obtain the image-point movement amounts as seen on the object plane and to cope with cases where two or more surfaces i~j are decentered, the decentering aberration coefficients are reduced to expressions (3A) to (3F) below. Now that the decentering aberration coefficients are redefined by expressions (3A) to (3F), it is possible to use expressions (1A) to (1H), as they are, as definitions of the image-point movement amounts on the object plane.

$$(\Delta E)i\sim j = -2\cdot(\alpha j' - \alpha i) \quad (3A)$$

$$(VE1)i\sim j = (\alpha j' - \alpha i)\cdot V_R - (\alpha j'\# - \alpha i\#)\cdot \quad (3B)$$
$$III_R - (\alpha i\cdot V_D - \alpha i\#\cdot III_D)$$

-continued $$(VE2)i \sim j = (\alpha j\# - \alpha i\#) P_R - \alpha i\# \cdot P_D \quad (3C)$$

$$(IIIE)i \sim j = (\alpha j' - \alpha i) \cdot III_R - (\alpha j'\# - \alpha i\#) \cdot \\ II_R - (\alpha i \cdot III_D - \alpha i\# \cdot II_D) \quad (3D)$$

$$(PE)i \sim j = (\alpha j' - \alpha i) \cdot P_R - \alpha i \cdot P_D \quad (3E)$$

$$(IIE)i \sim j = (\alpha j' - \alpha i) \cdot II_R - (\alpha j'\# - \alpha i\#) \cdot \\ I_R - (\alpha i \cdot II_D - \alpha i\# \cdot I_D) \quad (3F)$$

[Off-axial image-point movement errors]

Next, the off-axial image-point movement errors will be described. Assume that the decentering aberration coefficients (of a reversed optical system) are ΔE, VE1, VE2, IIIE, PE, and IIE. For a principal light ray (R=0), the amounts of the image-point movements caused on the object plane as the result of the decentering (before performing rotational conversion on the object plane) are represented by expressions (4A) and (4B) below. Expressions (4A) and (4B) are obtained by substituting R=0 in expressions (1A) and (1B).

$$\Delta Y\# = -(E/2\alpha'_k) \cdot [\Delta E + (N \cdot \tan \Omega)^2 \cdot \{(2 + \cos^2 \phi\Omega) VE1 - VE2\}] \quad (4A)$$

$$\Delta Z\# = -(E/2\alpha') \cdot \{(N \cdot \tan \Omega)^2 \cdot \sin 2\phi\Omega \cdot VE1\} \quad (4B)$$

From expressions (4A) and (4B), expressions (4C) and (4D) below are obtained (for an axial light ray, tan Ω=0).

$$\Delta Y_0 \# = -(E/2\alpha'_k) \cdot \Delta E \quad (4C)$$

$$\Delta Z_0 \# = 0 \quad (4D)$$

Next, the rotational conversion will be described, with reference to FIGS. 26A and 26B. From FIG. 26A, the following expression is obtained:

$$Y\# = g\$_k \cdot \tan \Omega$$

This is transformed, using the sine theorem, into $$Y'\#/\{\sin(\pi/2 - \Omega')\} = (Y\# + \Delta Y\# - \Delta Y_0\#)/\{\sin(\pi/2 + \Omega' - \theta)\}$$

then, the ΔY'# after the rotational conversion is represented by $$\Delta Y'\# = (Y'\#) - (Y\#) = [Y\# \cdot \cos \Omega' + \{(\Delta Y\#) - (\Delta Y_0\#)\} \cdot \cos \Omega' - Y\# \cdot \cos(\Omega' - \theta)]/\cos(\Omega' - \theta)$$

The numerator of this expression is transformed into $$[Y\# \cdot \cos\omega' + \{(\Delta Y\#) - (\Delta Y_0\#)\} \cdot \cos\omega' - Y\# \cdot \cos(\omega' - \theta)]$$
$$= Y\# \cdot \cos\omega' + \{(\Delta Y\#) - (\Delta Y_0\#)\} \cdot \cos\omega' - Y\# \cdot \cos\theta \cdot \cos\omega' - Y\# \cdot \sin\theta \cdot \sin\omega'$$
$$= (1 - \cos\theta) \cdot Y\# \cdot \cos\omega' + \{(\Delta Y\#) - (\Delta Y_0\#)\} \cdot \cos\omega' - Y\# \cdot \sin\theta \cdot \sin\omega'$$

Here, since e is small and negligible compared with the other two terms, $(1 - \cos \theta) \approx \theta^2/2$, $\sin \theta \approx \theta$. Moreover, $\cos \theta'/\{\cos(\theta' - \theta)\} \approx 1$, $\sin \Omega'/\{\cos(\Omega' - \theta)\} \approx \tan \Omega$.

Thus, the following expression is obtained.

$$\Delta Y'\# \approx (\Delta Y\# - \Delta Y_0\#) - Y\# \cdot \theta \cdot \tan \Omega$$

where $(\Delta Y\# - \Delta Y_0\#)$ represents the off-axial image-point movement errors resulting from the translational decentering, and $Y\# \cdot \theta \cdot \tan \Omega$ is an additional term related to the rotation (but not related to the aberration coefficients). Note that, since Ω here is on the X-Y cross section, $$\Delta Y'\# \approx (\Delta Y\# - \Delta Y_0\#) - Y\# \cdot \theta \cdot \tan \Omega \cdot \cos \phi\Omega \quad (5A)$$

Next, the conversion to the image plane IS will be described, with reference to FIG. 27. The magnification β is defined by $$\beta = g\$_1/g\$_k = \alpha_k/\alpha_1$$

Here, $\alpha_1 = 1/g\$_1$. On the other hand, the image plane IS and the object plane OS have a relation $$Y = \beta \cdot Y\#$$

Further, since Y# and ΔY# retain the form of $1/\alpha_k' \times ( )$, the above expression is further transformed, as $$Y = \beta \cdot Y\#$$
$$= (\alpha_k'/\alpha_1) \cdot (1/\alpha_k') \times ( )$$
$$= g\$_1 \times ( )$$

Here, if it is assumed that $g\$_1' \to \infty$, then $g\$_1 = -F1$. Hence, $$Y = -F1 \times ( )$$
$$= -F1 \times \alpha_k' \times Y_\#$$

Next, the off-axial image-point movement errors on the image plane will be described. From expression (4C) and $\alpha_k' = 1/g_k'\$$, the decentering amount E is obtained as $$\theta = \Delta Y_0\#/g\$_k' = E \cdot \Delta E/2$$
$$E = 2 \cdot \theta/\Delta E$$

Then, normalization is performed to make the hand-shake correction angle θ constant (0.7 deg=0.0122173 rad).

As the result of translational decentering (involving no rotational decentering), $\Delta Y = (\Delta Y\# - \Delta Y_0\#)$ is subjected to image-plane conversion (here, $N \cdot \tan \Omega = \Phi/F1$, $\Phi^2 = Y^2 + Z^2$). Thus, expressions (6A) to (6D) below are obtained.

$$\Delta Y = (\theta \cdot \Phi^2/F1) \cdot [\{(2 + \cos 2 \cdot \phi\Omega) \cdot VE1 - VE2\}/\Delta E] \quad (6A)$$

$$\Delta Z = (\theta \cdot \Phi^2/F1) \cdot [\{(\sin 2 \cdot \phi\Omega) \cdot VE1 - VE2\}/\Delta E] \quad (6B)$$

$Y_+$ Image Point, $Y_-$ Image Point {φΩ=0, π of expressions (6A) and (6B)}:

$$\Delta Y_Y = (\theta \cdot Y^2/F1) \cdot \{(3 \cdot VE1 - VE2)/\Delta E\} \quad (6C)$$

Z Image Point {φΩ=π/2 of expressions (6A) and (6B)}:

$$\Delta Y_Z = (\theta \cdot Z^2/F1) \cdot \{(VE1 - VE2)/\Delta E\} \quad (6D)$$

These expressions are then subjected to rotational conversion. Since $Y\# = -Y/(F1 \times a_k')$, the term $-Y\# \cdot \theta \cdot \tan \Omega \cdot \cos \phi\Omega$ of the expression (5A) can be expressed as $$-Y\# \cdot \theta \cdot \tan \Omega \cdot \cos \phi\Omega = Y/(F1 \times \alpha_k') \cdot \theta \cdot \tan \Omega \cdot \cos \phi\Omega$$

At the $Y_+$ and $Y_-$ image points, φΩ=0, π, and $\tan \Omega/\alpha_k' = Y$. Hence, on the image plane, $-Y\# \cdot \theta \cdot \tan \Omega \cdot \cos \phi\Omega = Y^2 \cdot \theta/F1$. By adding this to expression (6C), expression (6E) below is obtained. On the other hand, at the Z image point, φΩ=π/2. Hence, on the image plane, $-Y\# \cdot \theta \cdot \tan \Omega \cdot \cos \phi\Omega = 0$. By adding this to expression (6D), expression (6F) below is obtained.

$$\Delta Y_{Y'} = (\theta \cdot Y^2/F1) \cdot \{(3 \cdot VE1 - VE2 - \Delta E)/\Delta E\} \quad (6E)$$

$$\Delta Y_Z' = \Delta Y_Z \tag{6F}$$

[One-side blur]

Next, the one-side blur will be described. From the expressions (1A) and (1B), it is known that $\Delta M$ equals $\{\Delta Y$ with $\phi R=0$ in the first-degree terms with respect to $R\} \times g\$_k'$ and $\Delta S$ equals $\{\Delta Z$ with $\phi R=\pi/2$ in the first-degree terms with respect to $R\} \times g\$_k'$. On the object plane OS before rotation, the following expression holds (here, it is assumed that $a_k' = N_k'/g\$_k'$ and $E/2 = /\Delta E$):

$$\Delta M\# = (-g\$_k'^2 \cdot \theta/N_k') \times 2 \cdot R \cdot (N \cdot \tan \Omega) \cdot \cos \phi \Omega \cdot \{(3 \cdot IIIE + PE)/\Delta E\}$$

After rotation, the following expression holds:

$$\Delta M'\# \approx \Delta M\# + \theta Y\#$$

By converting the aberration coefficients to those as seen on the image plane and substituting $N_k' = 1$ and $N = 1$, the following expression is obtained:

$$\Delta M' = \beta^2 \cdot \Delta M'\# = -g\$_1^2 \cdot \theta \times 2 \cdot R \cdot \tan \Omega \cdot \cos \phi \Omega \cdot \{(3 \cdot IIIE + PE)/\Delta E\} + \beta \cdot Y \cdot \theta$$

Assume that the object plane OS is at $\infty$ (that is, $g\$_1 = -F1$, $\beta \to 0$, $\tan \Omega = Y/F1$, and $\phi \Omega = 0$). Then, the meridional one-side blur $\Delta M'$ is represented by expression (7A) below; likewise, the sagittal one-side blur is represented by expression (7B) below.

$$\Delta M' = -2 \cdot F1 \cdot Y \cdot \theta \cdot R \cdot \{(3 \cdot IIIE + PE)/\Delta E\} \tag{7A}$$

$$\Delta S' = -2 \cdot F1 \cdot Y \cdot \theta \cdot R \cdot (IIIE + PE)/\Delta E\} \tag{7B}$$

[Axial coma]

Next, the axial coma will be described. From expression (1A), it is known that the coma resulting from upward (upper) decentering of $\Omega = 0$ is represented by the following expression:

$$\Delta Y_{upper}\# = \Delta Y\#(\Omega = 0, \phi_R = 0) - \Delta Y\#(\Omega = 0, R = 0)$$

$$= -E/(2 \cdot \alpha') \times R^2 \times 3 \cdot IIE$$

On the other hand, the coma resulting from downward (lower) decentering by $\Omega = 0$ is represented by the following expression (having the same value and sign as $\Delta Y_{upper}\#$):

$$\Delta Y_{Lower}\# = \Delta Y\#(\Omega = 0, \phi_R = \pi) - \Delta Y\#(\Omega = 0, R = 0)$$

$$= -E/(2 \cdot \alpha') \times R^2 \times 3 \cdot IIE$$

Since $\Omega = 0$, the axial coma is little affected by the rotational conversion. As the result of the conversion from the object plane OS to the image plane IS ($\Delta Y = \beta \cdot \Delta Y\#$, $E/2 = \theta/\Delta E$), the following expression is obtained:

$$\Delta Y_{Upper} = F1 \times \theta \times R^2 \times (3 \cdot IIE/\Delta E) = \Delta Y_{Lower}$$

Hence, the axial coma AXCM is represented by expression (8A) below:

$$AXCM = (\Delta Y_{Upper} + \Delta Y_{Lower})/2$$

$$= \Delta Y_{upper} \tag{8A}$$

By using relevant portions of thus obtained expressions (6E), (6F), (7A), (7B), and (8A), the hand-shake aberration coefficients are now defined by expressions (9A) to (9E) below:

Off-axial image-point movement error of an image point on the Y axis:

$$VE_Y = \{(3 \cdot VE1 - VE2 - \Delta E)/\Delta E\} \tag{9A}$$

Off-axial image-point movement error of an image point on the Z axis:

$$VE_Z = \{(VE1 - VE2)/\Delta E\} \tag{9B}$$

Meridional single-sided blur:

$$IIIE_M = \{(3 \cdot IIIE + PE)/\Delta E\} \tag{9C}$$

Sagittal single-sided blur:

$$IIIE_S = \{(IIIE + PE)/\Delta E\} \tag{9D}$$

Off-axial coma:

$$IIE_A = \{(3 \cdot IIE)/\Delta E\} \tag{9E}$$

These expressions (9A) to (9E), which represent the hand-shake aberration coefficients, are then rearranged by substituting expressions (3A) to (3F) into them, and are eventually transformed into expressions (10A) to (10E) below.

$$VE_Y = -1/2 \cdot \{3V_R - 3V_D \cdot A + 2 - (3 \cdot III_R + P_R) \cdot \tag{10A}$$
$$H\# + (3 \cdot III_D + P_D) \cdot A\#\}$$

$$VE_Z = -1/2 \cdot \{V_R - V_D \cdot A - (III_R + P_R) \cdot H\# + \tag{10B}$$
$$(III_D + P_D) \cdot A\#\}$$

$$IIIE_M = -1/2 \cdot \{(3 \cdot III_R + P_R) - (3 \cdot III_D + P_D) \cdot \tag{10C}$$
$$A - 3 \cdot II_R \cdot H\# + 3 \cdot II_D \cdot A\#\}$$

$$IIIE_S = -1/2 \cdot \{(III_R + P_R) - (III_D + P_D) \cdot A - II_R \cdot \tag{10D}$$
$$H\# + II_D \cdot A\#\}$$

$$IIE_A = -3/2 \cdot (II_R + II_D \cdot A - I_R \cdot H\# + I_D \cdot A\#) \tag{10E}$$

where ( )$_D$: sum of the aberration coefficients of the lenses constituting the hand-shake correction lens unit;

( )$_R$: sum of the aberration coefficients of the lenses disposed on the downstream side of the hand-shake correction lens unit;

$A = \alpha i/(\alpha j' - \alpha i)$ (here, the hand-shake correction lens unit is assumed to include surfaces i~j);

$A\# = \alpha i\#/(\alpha j' - \alpha i)$;

$H\# = (\alpha i'\# - \alpha i\#)/(\alpha j' - \alpha i)$.

Since $\Delta E = -2 \cdot (\alpha j' - \alpha i)$ (here, $(\alpha j' - \alpha i) = \pm 0.0122173$ if $0.7°/$mm) is a coefficient representing (hand-shake correction angle)/(decentering amount), it converges approximately on a predetermined value (though the sign depends on whether the hand-shake correction lens unit has a positive or negative power). Therefore, A represents an incident angle of a marginal light ray to the hand-shake correction lens units (as seen from the image side), and A# varies in proportion to the incident angle of a principal light ray. In cases where h# and h vary only slightly in the hand-shake correction lens unit, then H# represents the ratio of h# of the principal light ray to h of the marginal light ray.

The decentering aberration coefficients defined by expressions (10A) to (10E) are based on a reversed optical system. Accordingly, they now need to be converted back into coefficients based on a non-reversed optical system. To achieve this, expressions (10A) to (10E) are converted, by using expressions (2A) to (2J) noted previously, into expressions (11A) to (11E) below, which represents the aberration coefficients based on a non-reversed optical system.

$$VE_Y = +1/2 \cdot \{3V_F - 3V_D \cdot A - 2 + (3 \cdot III_F + P_F)H\# - (3 \cdot III_D + P_D) \cdot A\#\} \quad (11A)$$

$$VE_Z = +1/2 \cdot \{V_F - V_D \cdot A + (III_F + P_F)H\# - (III_D + P_D) \cdot A\#\} \quad (11B)$$

$$IIIE_M = -1/2 \cdot \{(3 \cdot III_F + P_F) - (3 \cdot III_D + P_D) \cdot A + 3 \cdot II_F \cdot H\# - 3 \cdot II_D \cdot A\#\} \quad (11C)$$

$$IIIE_S = -1/2 \cdot \{(III_F + P_F) - (III_D + P_D) \cdot A + II_F \cdot H\# - II_D \cdot A\#\} \quad (11D)$$

$$IIE_A = +3/2 \cdot (II_F - II_D \cdot A + I_F \cdot H\# - I_D \cdot A_\#) \quad (11E)$$

where ( )$_D$: sum of the aberration coefficients of the lenses constituting the hand-shake correction lens unit, as seen in a non-reversed optical system;

( )$_F$: sum of the aberration coefficients of the lenses disposed on the upstream side of the hand-shake correction lens unit;

A=−αn'/(αn'−αm);

A#=αn'#/(αn'−αm);

H=−(αn'#−αm#)/(αn'−αm)=−(Σhμ#·φμ)/(Σhμ−μ);

ΔE=−2(αn'−αm), (Here, it is assumed that the hand-shake correction lens unit includes surfaces m→n, the non-reversed optical system j←i).

From expressions (11A) to (11E) above, the following conclusions are drawn.

First, as noted previously, whereas the method described in Y. Matsui's thesis is directed to cases where the hand-shake correction lens unit (i.e. the decentered lens LS) and the lenses disposed on the downstream side thereof affect the optical performance, expressions (11A) to (11E) are directed to cases where the hand-shake correction lens unit and the lenses disposed on the upstream side thereof affect the optical performance.

Second, whereas the off-axial image-point movement errors tend to be larger in wide-angle optical systems (since the focal length F1 of the hand-shake correction lens unit is in the denominator), the one-side blur and axial coma tend to be larger in telephoto optical systems.

Third, although it is possible to reduce the aberrations resulting from the decentering by reducing the aberration coefficients of the hand-shake correction lens unit and the lenses disposed on the upstream side thereof, there still remains a constant term (−2 in { } of expression (11A)) in the coefficient VE$_Y$ representing the off-axial image-point movement errors ΔY$_Y$'. This term indicates that the object plane OS and the image plane IS become inclined with respect to each other as a result of a rotational hand shake. And this term (−2) contributes to a considerable increase in off-axial image-point movement errors in wide-angle optical systems. For example, at a focal length F1 of 38 mm, the off-axial image-point movement errors are as large as ΔY$_Y$'=−72 μm, and are therefore not negligible. Moreover, the off-axial image-point movement errors due to the constant term (−2) remain even when all the aberration coefficients are set to 0. Accordingly, it is preferable to set the aberration coefficients such that the constant term (−2) is canceled out.

Fourth, to reduce the aberrations resulting from the decentering, it is necessary to reduce the aberration coefficients as well as the factors such as A, A#, and H# included therein. As for A and A#, this can be achieved by increasing their denominator α$_n$'−αm. However, since such an operation directly affects ΔE=−2(α$_n$'−αm), an excessive increase in α$_n$'−αm leads to an excessively high hand-shake correction sensitivity (how much (°) a light beam is inclined by a unit amount (mm) of decentering), which necessitates high accuracy in the driving mechanism. As for H#, as the hand-shake correction lens unit is disposed closer to aperture diaphragm, h# of each surface becomes smaller, and thus H# also becomes smaller.

BRIEF DESCRIPTION OF THE DRAWINGS

This and other objects and features of this invention will become clear from the following description, taken in conjunction with the preferred embodiments with reference to the accompanied drawings in which:

FIGS. 2A to 2I are aberration diagrams showing the longitudinal aberrations in the first embodiment before decentering;

FIGS. 3A to 3F are aberration diagrams showing the meridional lateral aberrations in the first embodiment before and after decentering, at the wide-angle end;

FIGS. 4A to 4F are aberration diagrams showing the meridional lateral aberrations in the first embodiment before and after decentering, at the telephoto end;

FIGS. 6A to 6C are aberration diagrams showing the longitudinal aberrations in the first embodiment before decentering;

FIGS. 7A to 7F are aberration diagrams showing the meridional lateral aberrations in the second embodiment before and after decentering;

FIG. 8 is a lens construction diagram of the third embodiment of the present invention;

FIGS. 9A to 9C are aberration diagrams showing the longitudinal aberrations in the third embodiment before decentering;

FIGS. 10A to 10F are aberration diagrams showing the meridional lateral aberrations in the third embodiment before and after decentering;

FIGS. 12A to 12I are aberration diagrams showing the longitudinal aberrations in the fourth embodiment before decentering;

FIGS. 13A to 13F are aberration diagrams showing the meridional lateral aberrations in the fourth embodiment before and after decentering, at the wide-angle end;

FIGS. 14A to 14F are aberration diagrams showing the meridional lateral aberrations in the fourth embodiment before and after decentering, at the telephoto end;

FIG. 15 is a lens construction diagram of the fifth embodiment of the present invention;

FIGS. 16A to 16I are aberration diagrams showing the longitudinal aberrations in the fifth embodiment before decentering;

FIGS. 17A to 17F are aberration diagrams showing the meridional lateral aberrations in the fifth embodiment before and after decentering, at the wide-angle end;

FIGS. 18A to 18F are aberration diagrams showing the meridional lateral aberrations in the fifth embodiment before and after decentering, at the telephoto end;

FIG. 20 is a graph showing the relations between the shape factor of a positive lens and the aberration coefficients;

DESCRIPTION OF THE PREFERRED EMBODIMENTS

Figure 1:
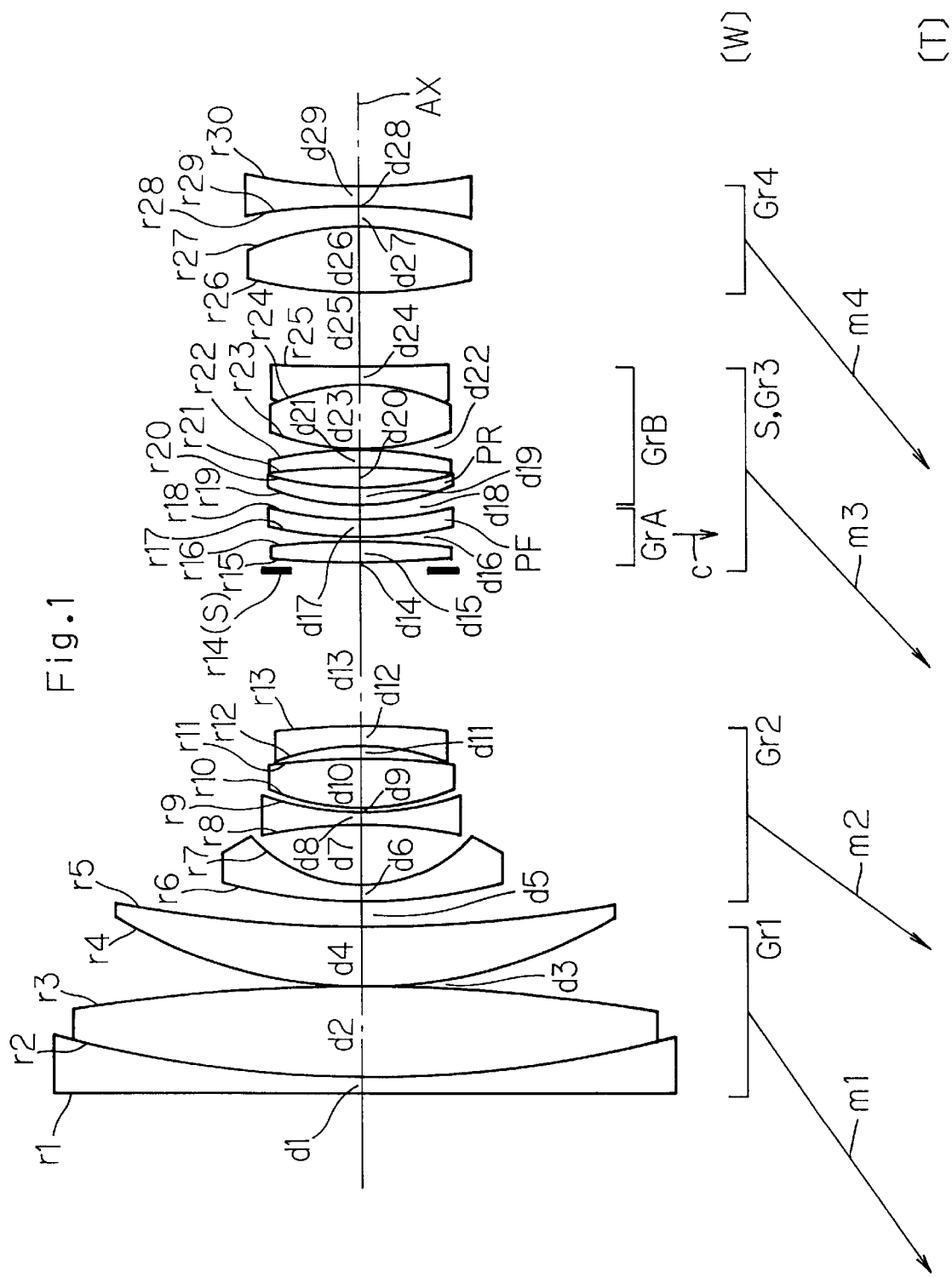
FIG. 1 is a lens construction diagram of the first embodiment of the present invention.
Figure 4A:
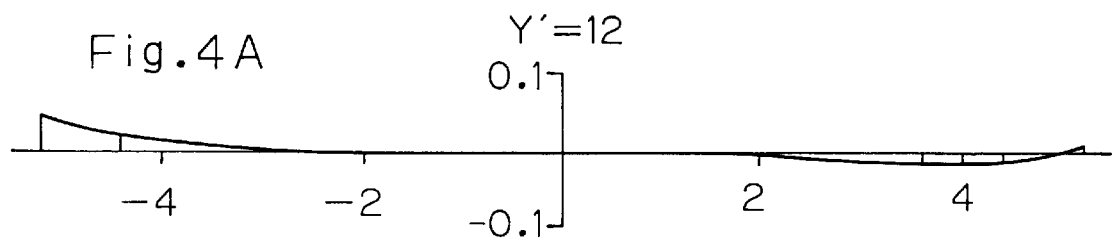
Figure 4B:
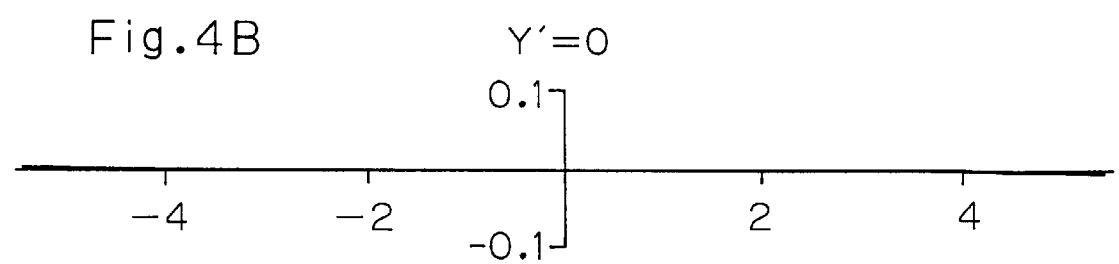
Figure 4C:
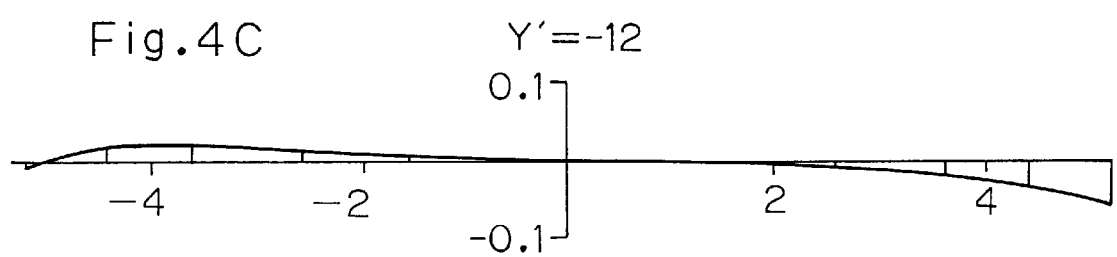
Figure 4D:
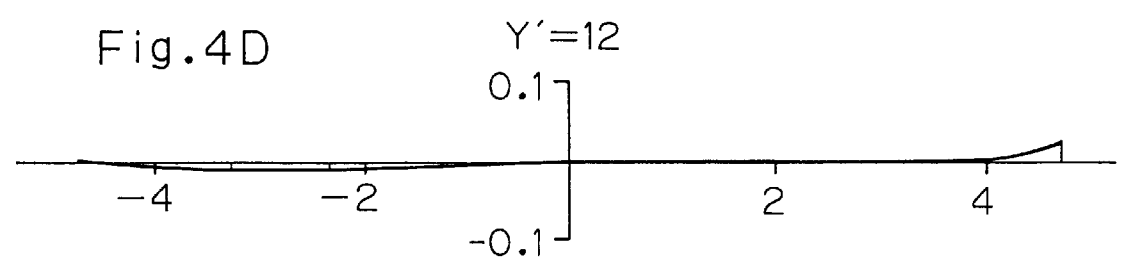
Figure 4E:
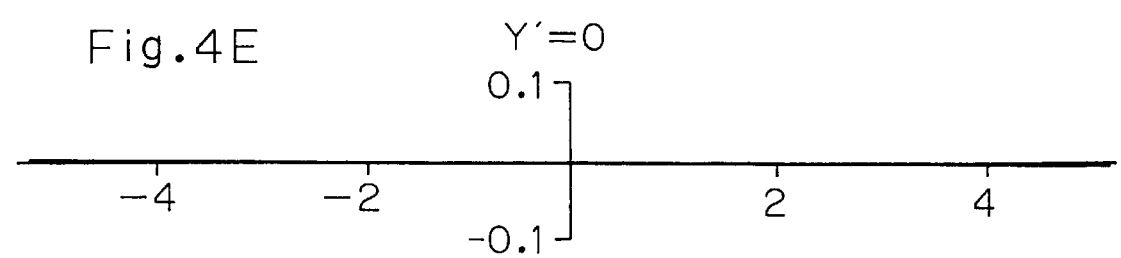
Figure 5:
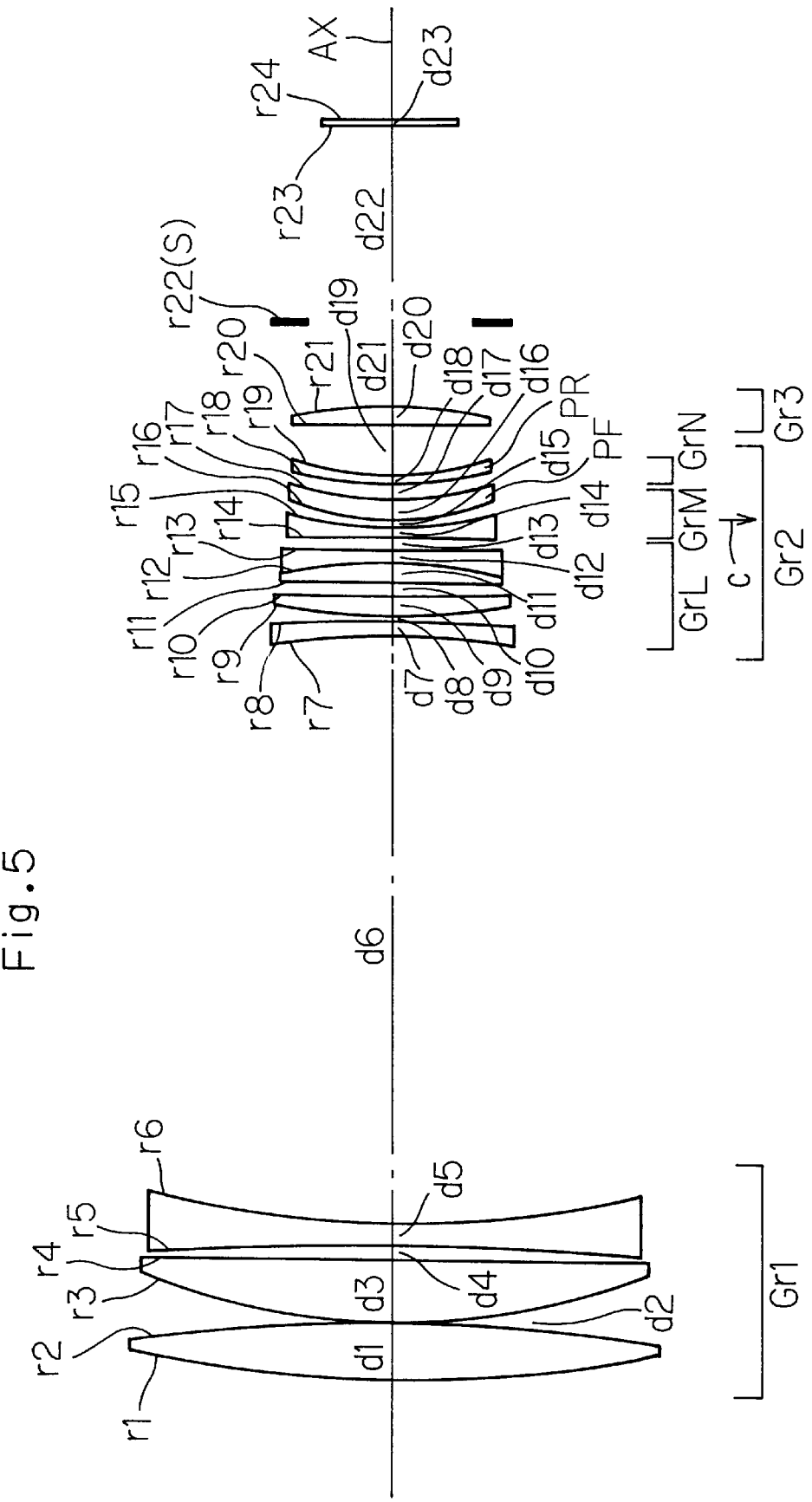
FIG. 5 is a lens construction diagram of the second embodiment of the present invention.
Figure 7A:
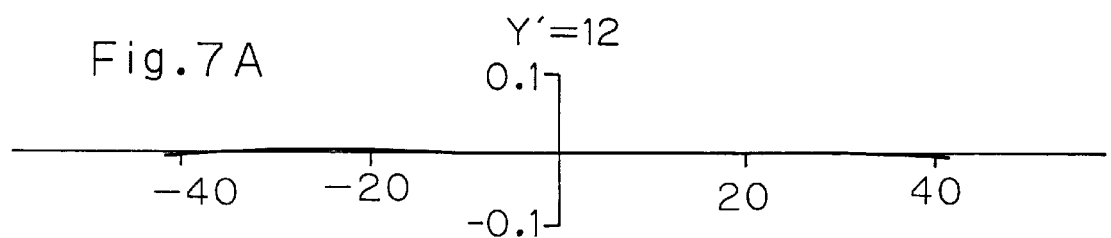
Figure 7B:
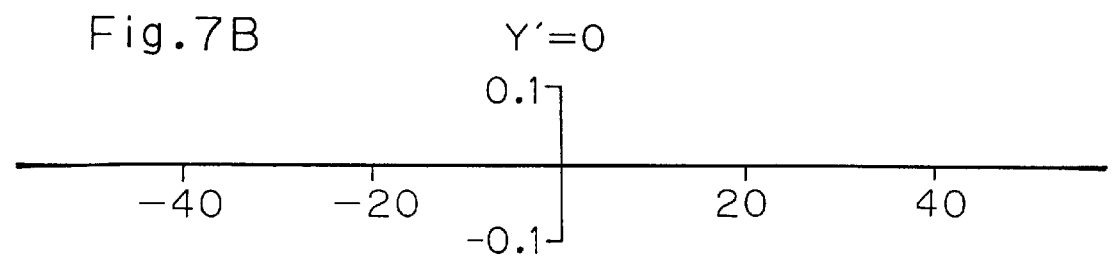
Figure 7C:
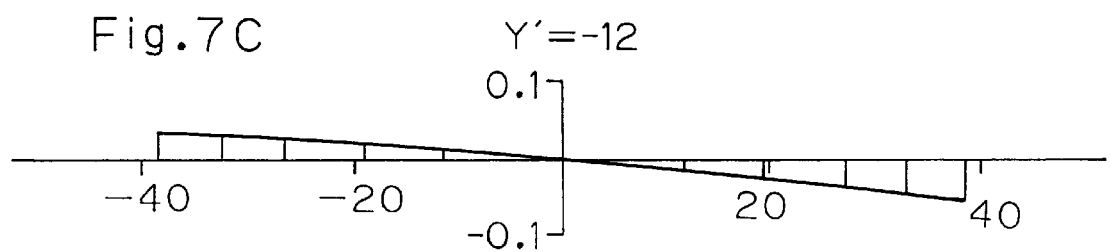
Figure 7D:
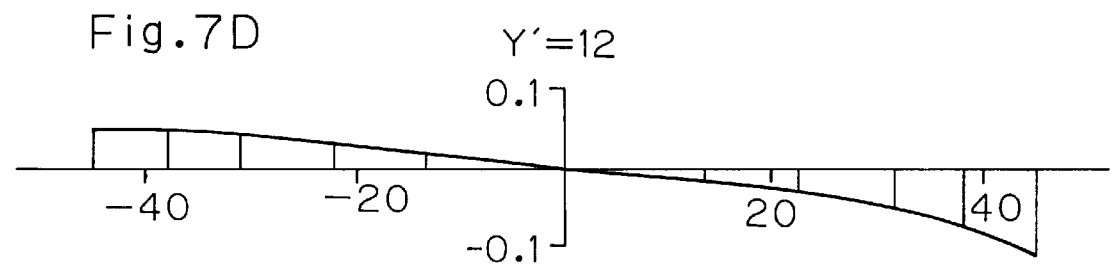
Figure 7E:
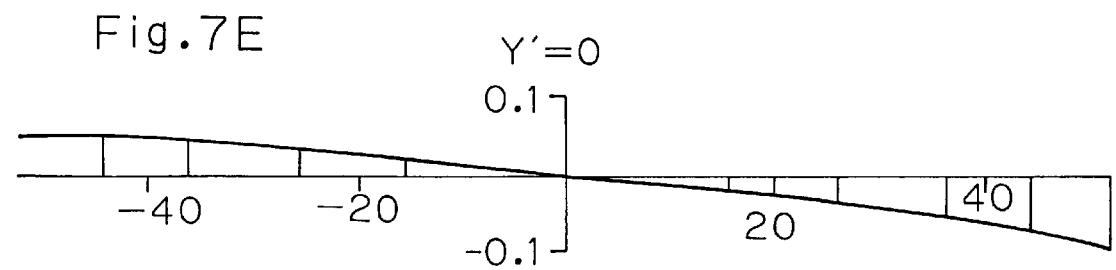
Figure 10A:
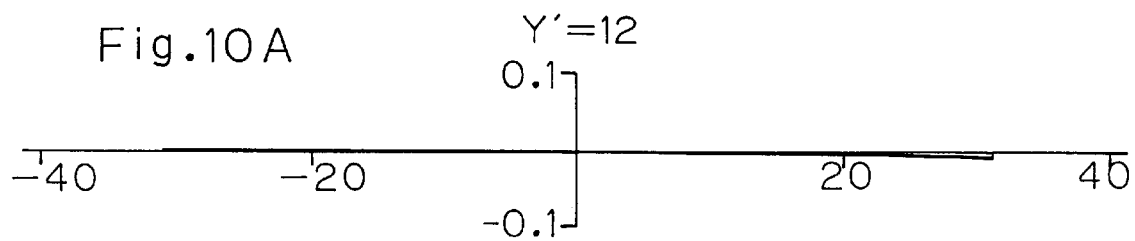
Figure 10B:
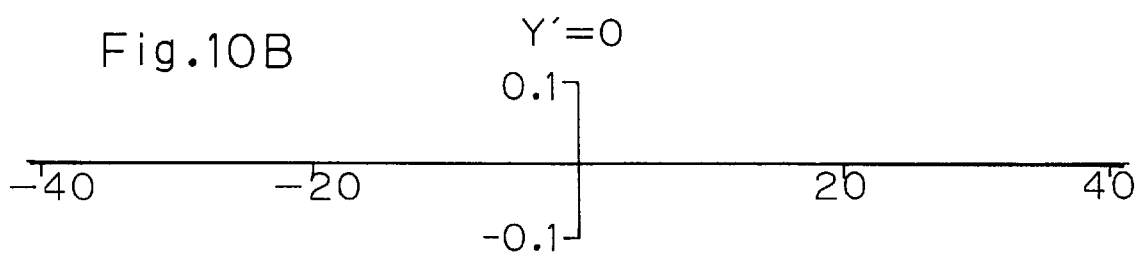
Figure 10C:
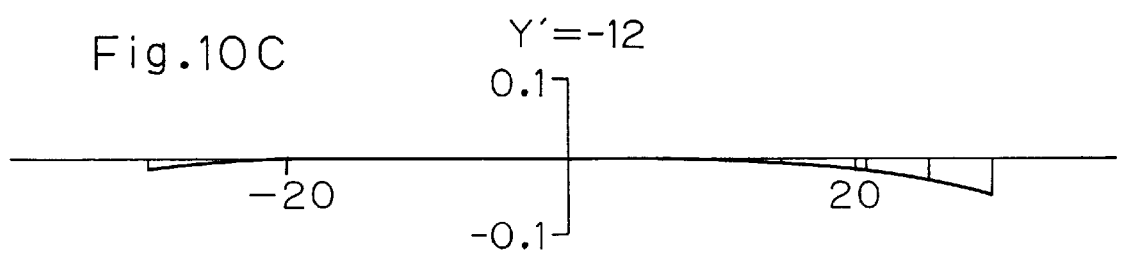
Figure 10D:
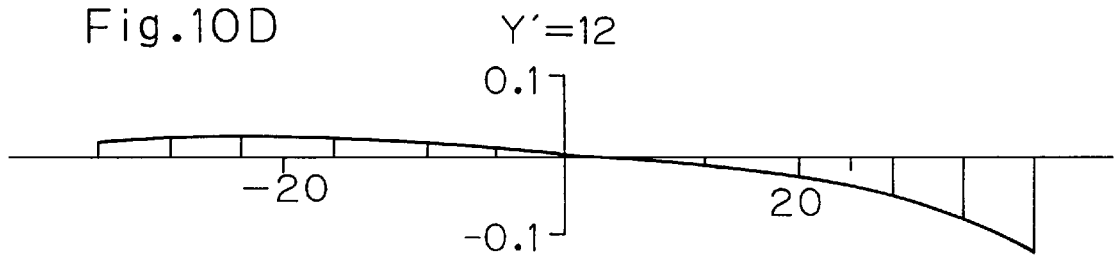
Figure 10E:
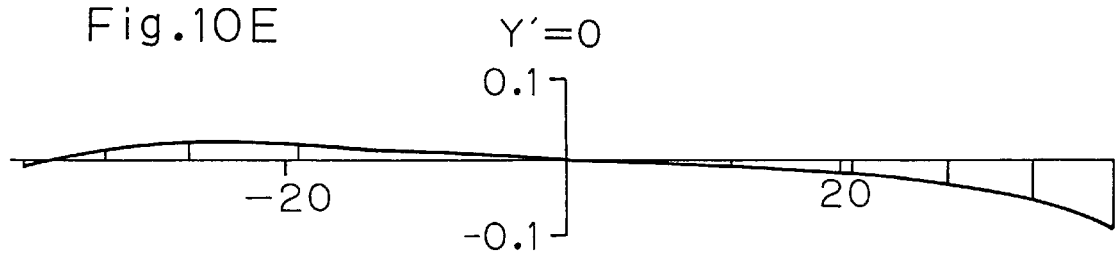
Figure 11:
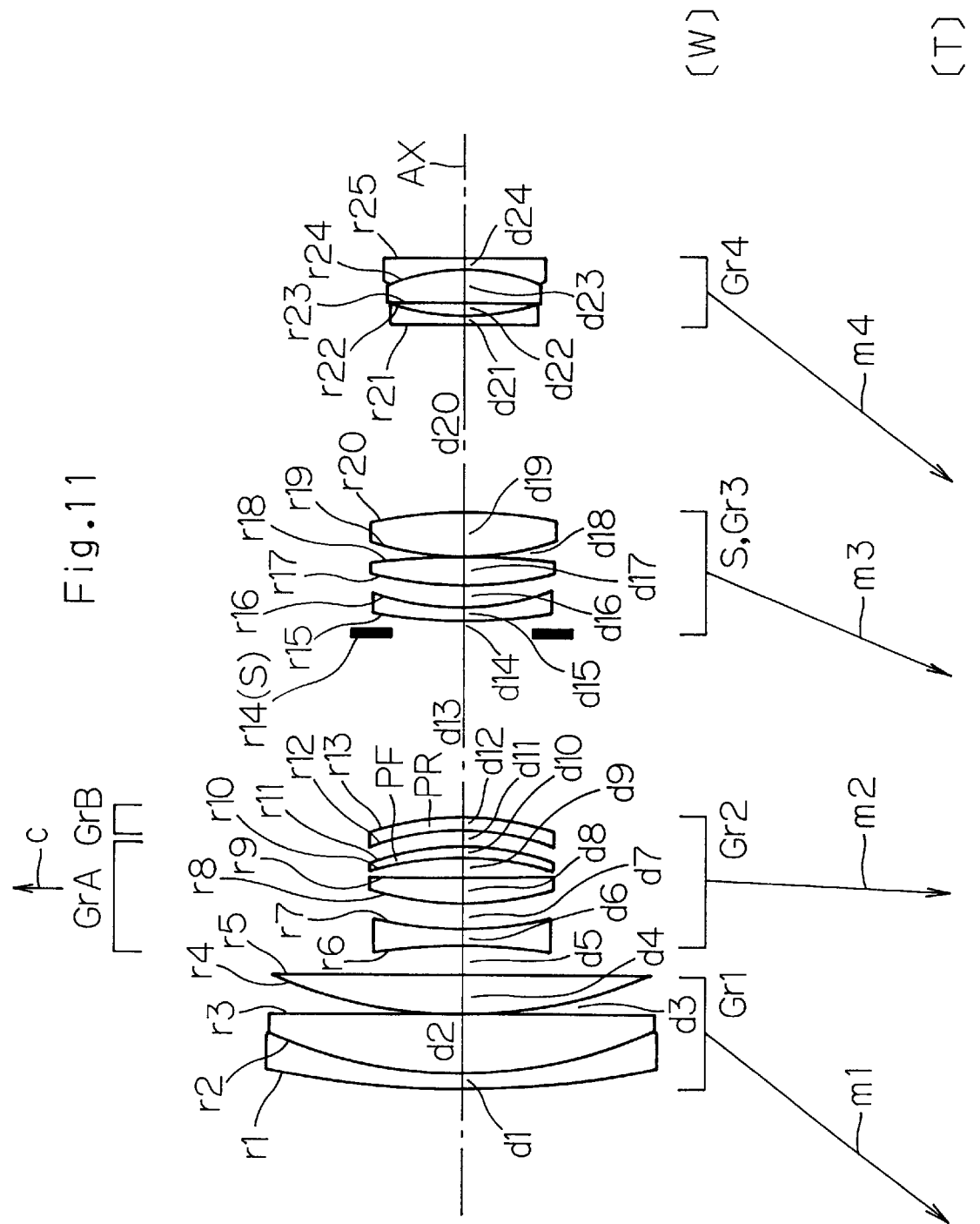
FIG. 11 is a lens construction diagram of the fourth embodiment of the present invention.
Figure 18A:
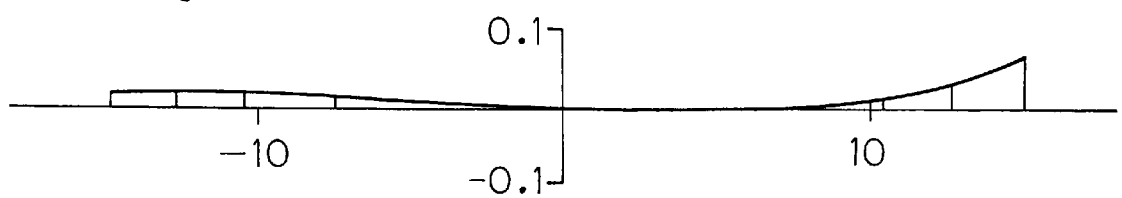
Figure 18B:
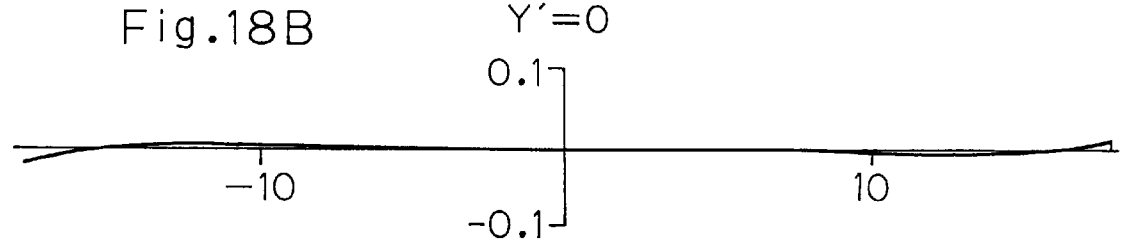
Figure 18C:
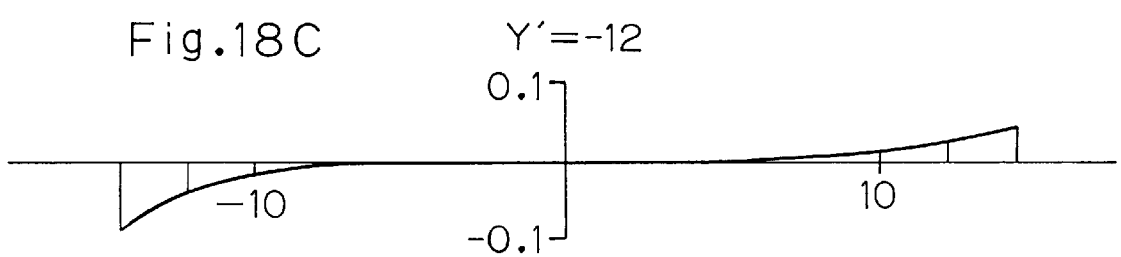
Figure 18D:
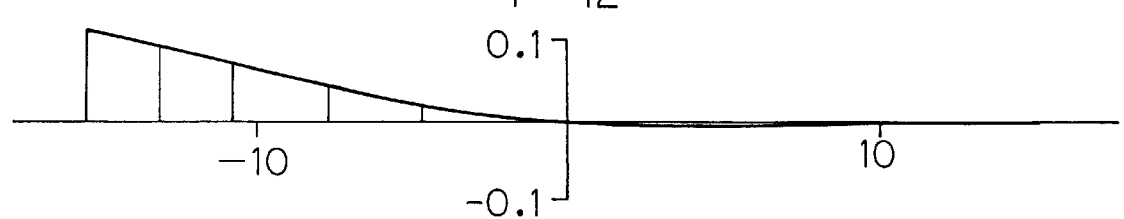
Figure 18E:
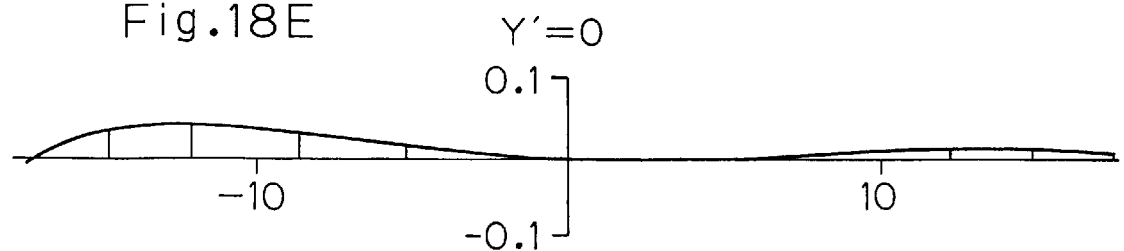
Figure 19:
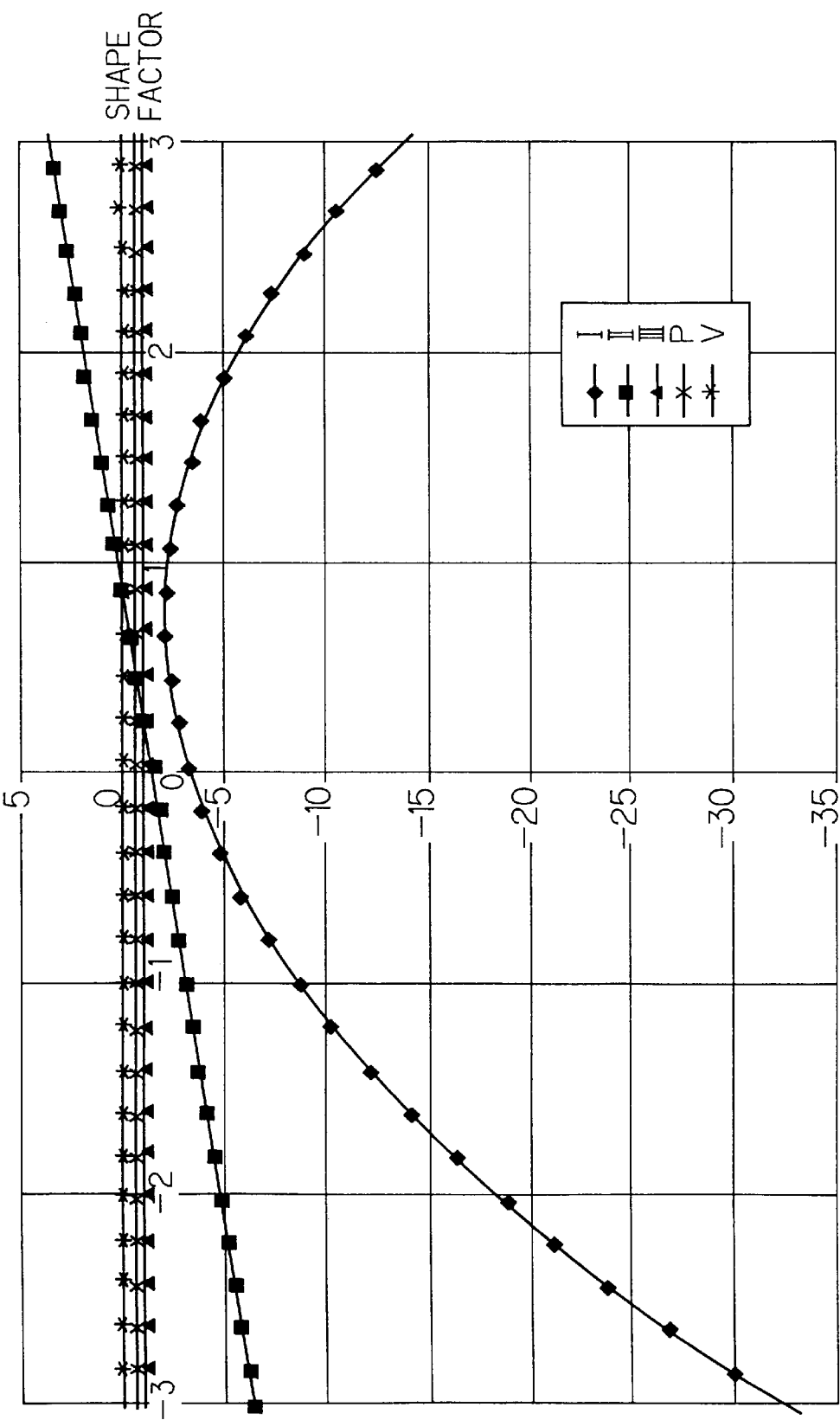
FIG. 19 is a graph showing the relations between the shape factor of a negative lens and the aberration coefficients.
Figure 21A:
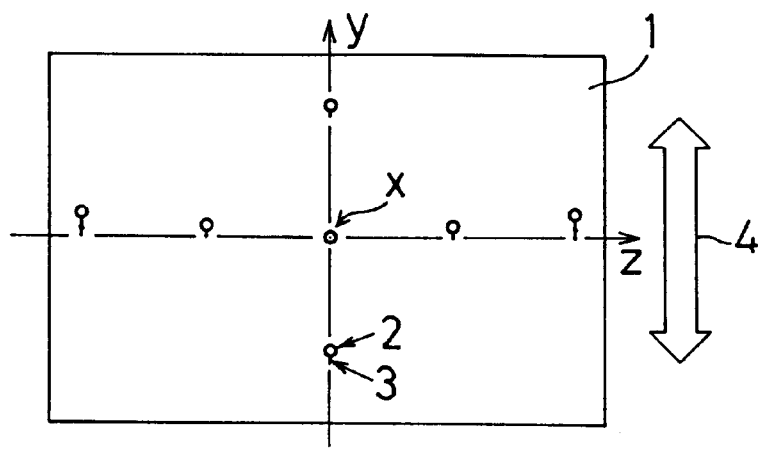
FIGS. 21A to 21D are diagrams explaining the factors causing image degradation in a hand-shake correction optical system.
Figure 21B:
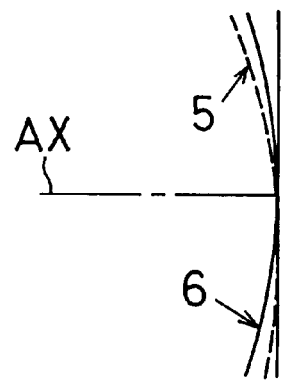
Figure 21C:
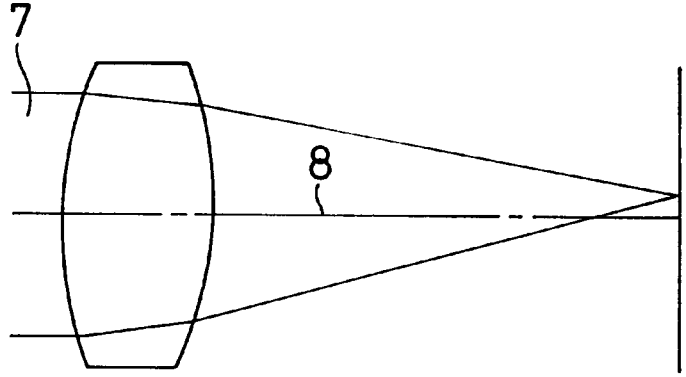
Figure 21D:
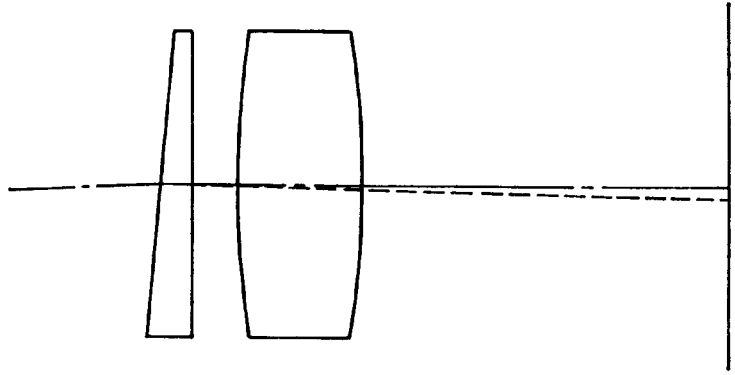
Figure 22:
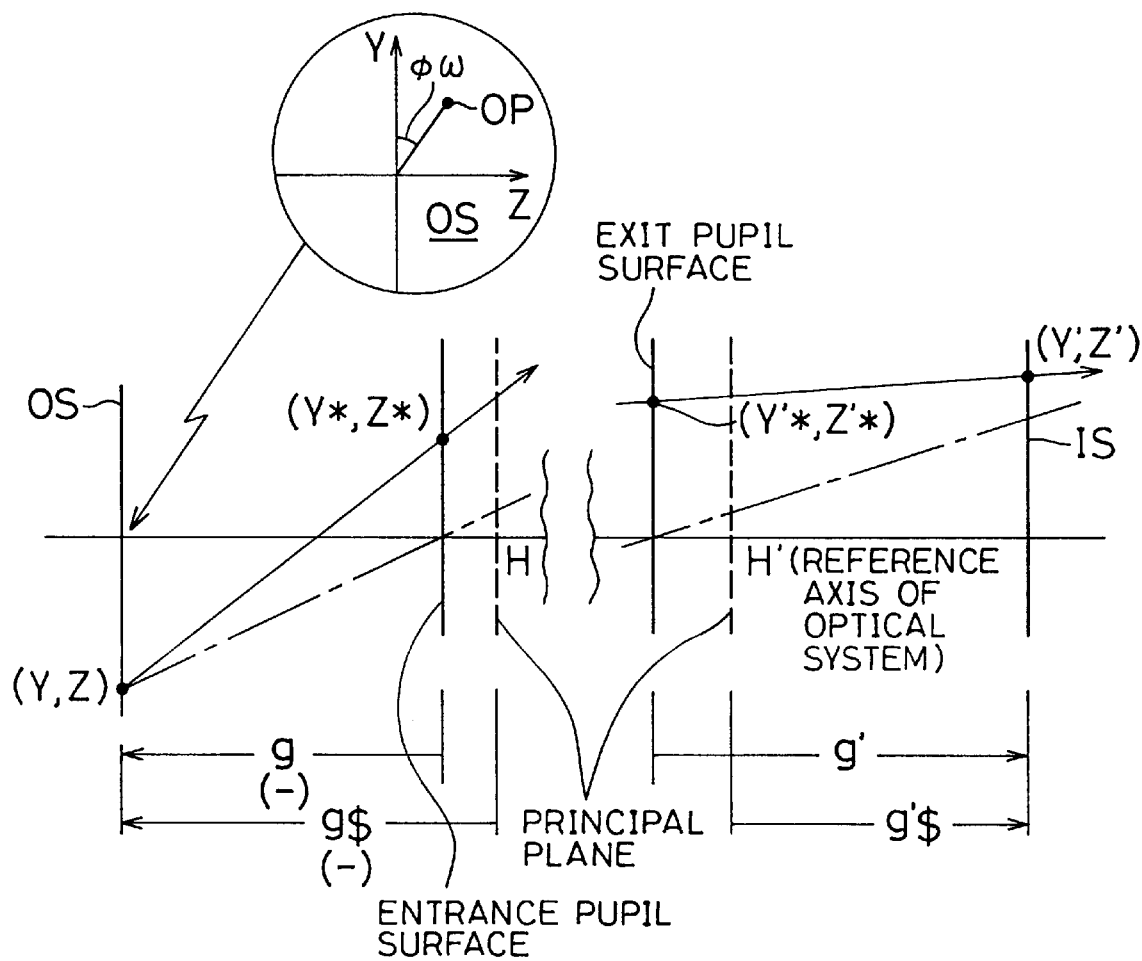
FIG. 22 is a diagram explaining the relationship between an optical system and a coordinate system.
Figure 23A:
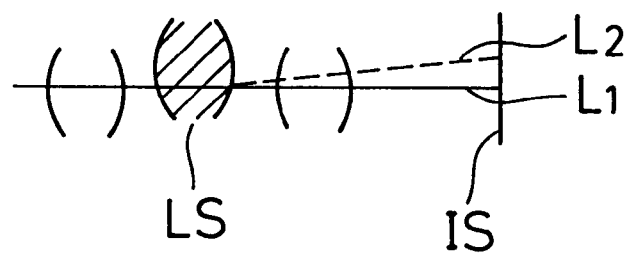
FIGS. 23A and 23B are diagrams explaining light-ray path shifts resulting from decentering.
Figure 23B:
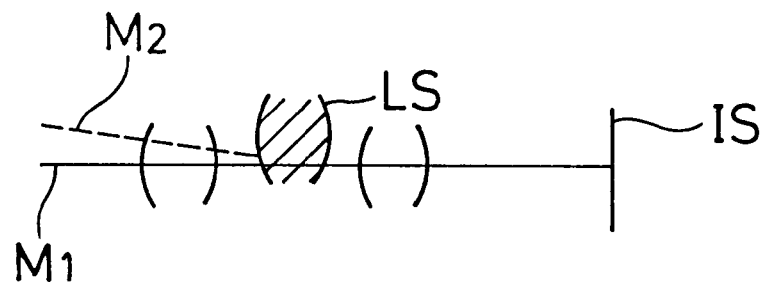
Figure 24:
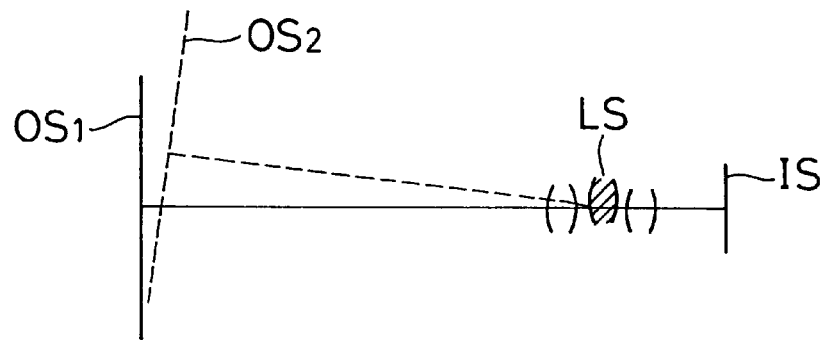
FIG. 24 is a diagram explaining the rotational conversion of the object plane.
Figure 25:
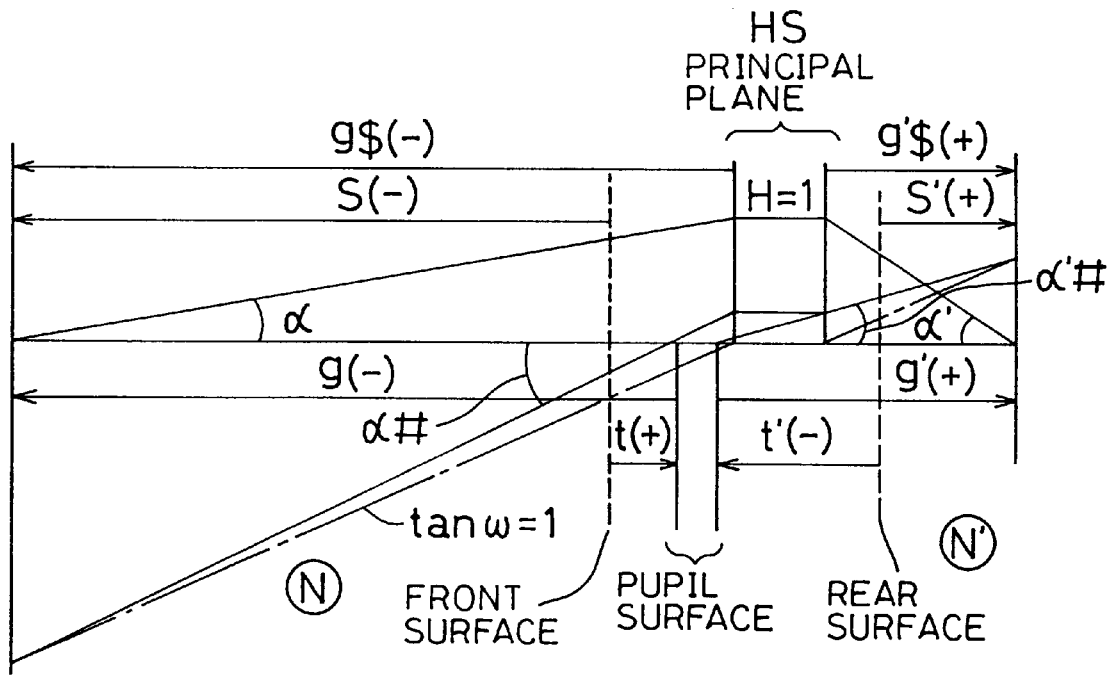
FIG. 25 is a diagram explaining the aberration coefficients in a reversed and a non-reversed optical system.
Figure 26A:
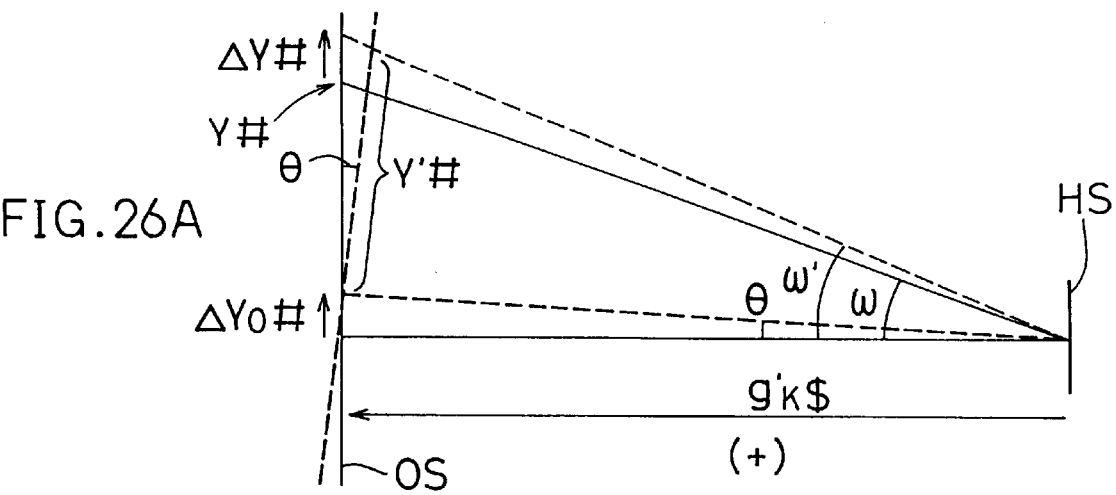
FIGS. 26A and 26B are diagrams explaining the rotational conversion.
Figure 26B:
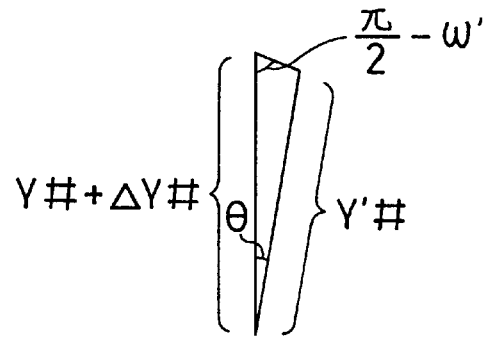
Figure 27:
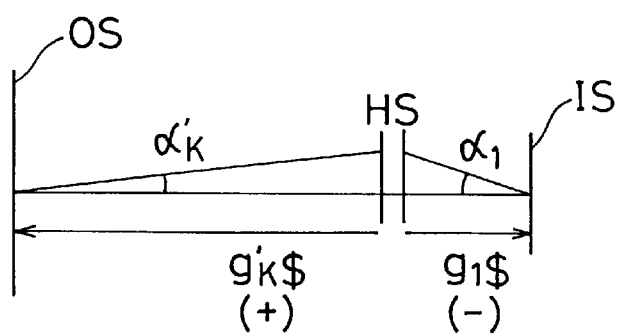
FIG. 27 is a diagram explaining the use of the image plane in place of the object plane.

Hereinafter, optical systems having a hand-shake correction function according to the present invention will be described with reference to the drawings. FIGS. 1, 5, 8, 11, and 15 are diagrams showing respectively the lens construction of a first to a fifth embodiment of the present invention, each illustrating the lens construction in the normal (pre-decentering) state at the wide-angle end [W]. In each figure, ri (i=1, 2, 3, . . . ) represents the radius of curvature of the i-th surface from the object side, and di (i=1, 2, 3, . . . ) represents the i-th axial distance from the object side. In FIGS. 1, 11, and 15, arrows m1 to m4 schematically show the movement directions of the first lens unit Gr1, the second lens unit Gr2, the aperture diaphragm S together with the third lens unit Gr3, and the fourth lens unit Gr4, respectively, during zooming from the wide-angle end [W] to the telephoto end [T]. In FIGS. 1, 5, 8, 11, and 15, arrow C schematically show the movement direction of a hand-shake correction lens unit.

The zoom lens system of the first embodiment consists of, from the object side, a first lens unit Gr1 having a positive refractive power, a second lens unit Gr2 having a negative refractive power, a third lens unit having a positive refractive power, and a fourth lens unit having a positive refractive power, and zooming is performed by varying the distances between these lens units. In the first embodiment, the third lens unit Gr3 is divided into, from the object side, a front lens unit GrA and a rear lens unit GrB. Here, the front lens unit GrA serves as a hand-shake correction lens unit, and hand-shake correction is achieved by decentering it translationally (that is, by decentering it in a direction perpendicular to the optical axis AX).

The single-focal-length lens systems of the second and third embodiments consist of, from the object side, a first lens unit Gr1 having a positive refractive power, a second lens unit Gr2 having a negative refractive power, and a third lens unit Gr3 having a positive refractive power, and focusing is performed by moving the second lens unit Gr2. In the second and third embodiments, the second lens unit Gr2 is divided into, from the object side, a fixed lens unit GrL, a hand-shake correction lens unit GrM, and another fixed lens unit GrN, and hand-shake correction is achieved by decentering the hand-shake correction lens unit GrM translation-ally. Moreover, a protective glass is provided at the image-side end of these single-focal-length lens systems.

The zoom lens systems of the fourth and fifth embodiments consist of, from the object side, a first lens unit Gr1 having a positive refractive power, a second lens unit Gr2 having a negative refractive power, a third lens unit Gr3 having a positive refractive power, and a fourth lens unit Gr4 having a negative refractive power, and zooming is performed by varying the distances between these lens units. In the fourth and fifth embodiments, the second lens unit Gr2 is divided into, from the object side, a front lens unit GrA and a rear lens unit GrB. Here, the front lens unit GrA serves as a hand-shake correction lens unit, and hand-shake correction is achieved by decentering it translationally.

In all the embodiments of the present invention, the lens element PF disposed at the image-side end of the hand-shake correction lens unit and the lens element PR disposed next to the image-side surface of the lens element PF and kept in a fixed position during hand-shake correction satisfy conditions (1), (2), and (4), or conditions (1), (3), and (4). This makes it possible to correct various aberrations properly both in the normal state and in the hand-shake correction state.

Tables 1 to 5 list the construction data, aberration characteristics, and other data of the optical systems of the above described first to fifth embodiments (FIGS. 1, 5, 8, 11, and 15), respectively. In these tables, ri (i=1, 2, 3, . . . ) represents the radius of curvature of the i-th surface from the object side, di (i=1, 2, 3, . . . ) represents the i-th axial distance from the object side (as observed before decentering), and Ni (i=1, 2, 3, . . . ) and vi (i=1, 2, 3, . . . ) represent the refractive index (Nd) and the Abbe number (vd), for d-lines, of the i-th lens element from the object side, respectively. Moreover, for each of such axial distances that vary with zooming, three values are given which are the actual axial distances between the lens units involved when the optical system is set at the wide-angle end [W], at the middle focal length [M], and at the telephoto end [T], respectively. Likewise, for the focal length f and the f-number FNO of the entire system, three values are listed which respectively correspond to the above three states of the optical system.

In the first embodiment, the surface having the radius of curvature r28* is an aspherical surface. It is assumed that an aspherical surface is defined by formula (AS) below.

$$X = C \cdot Y^2 / \{1 + (1 - \in \cdot C^2 \cdot Y^2)^{1/2}\} + A4 \cdot Y^4 + A6 \cdot Y^6 + A8 \cdot Y^8 + A10 \cdot Y^{10} + A12 \cdot Y^{12}) \quad (AS)$$

where

X: displacement from the reference surface of the optical axis direction;

Y: height in a direction perpendicular to the optical axis;

C: paraxial curvature;

∈: quadric surface parameter; and

A4, A6, A8, A10, and A12: aspherical coefficients of the fourth, sixth, eighth, tenth, and twelfth degree.

Tables 6 to 9 list the actual values corresponding to the previously noted conditions (1) to (11) as observed in each embodiment, together with related data.

FIGS. 2A to 2I, 6A to 6C, 9A to 9C, 12A to 12I, and 16A to 16I are aberration diagrams showing the longitudinal aberrations observed in the first to fifth embodiments, respectively, when the optical system is in the normal (pre-decentering) state. Among these figures, FIGS. 2A to 2C, 12A to 12C, and 16A to 16C show the longitudinal aberrations observed when the optical system is set to the wide-angle end [W], FIG. 2D to 2F, 12D to 12F, and 16D to 16F show those when the optical system is set to the middle focal length [M], and FIG. 2G to 2I, 12G to 12I, and 16G to 16I show those when the optical system is set to the telephoto end [T]. In each aberration diagram, the solid line (d) represents the aberration for d-lines, and the broken line (SC) represents the sine condition. Moreover, the broken line (DM) and the solid line (DS) represent the astigmatism on the meridional and sagittal planes, respectively.

FIGS. 3A to 3E and 4A to 4E, 7A to 7E, 10A to 10E, 13A to 13E and 14A to 14E, and 17A to 17E and 18A to 18E are aberration diagrams showing the lateral aberrations observed with respect to a light beam on the meridional plane in the first to fifth embodiments, respectively, with FIGS. 3A to 3E, 13A to 13E, and 17A to 17E showing those when the optical system is set to the wide-angle end [W], and FIGS. 4A to 4E, 14A to 14E, and 18A to 18E showing those when the optical system is set to the telephoto end [T]. FIGS. 3A to 3B and 4A to 4B, 7A to 7B, 10A to 10B, 13A to 13B and 14A to 14B, and 17A to 17B and 18A to 18B show such aberrations observed before the decentering of the hand-shake correction lens unit, whereas FIGS. 3C to 3E and 4C to 4E, 7C to 7E, 10C to 10E, 13C to 13E and 14C to 14E, and 17C to 17E and 18C to 18E show such aberrations after the decentering. Here, it is assumed that, after the decentering, that is, in the hand-shake correction state, the hand-shake correction lens unit is inclined at a hand-shake correction angle of $\theta=0.7°$ (=0.0122173 rad).

As described heretofore, according to the present invention, it is possible to correct various aberrations properly both in the normal state and in the hand-shake correction state.

TABLE 1

<< Embodiment 1 >>
f = 22.6~50.5~78.0
FNO = 4.24~6.22~7.28

| | Radius of Curvature | | Axial Distance | | Refractive Index | Abbe Number |
|---|---|---|---|---|---|---|
| | <First Lens Unit Gr1 - positive> | | | | | |
| r1 | 971.931 | | | | | |
| | | d1 | 1.300 | N1 | 1.83350 v1 | 21.00 |
| r2 | 88.101 | | | | | |
| | | d2 | 6.550 | N2 | 1.58913 v2 | 61.11 |
| r3 | −137.987 | | | | | |
| | | d3 | 0.100 | | | |
| r4 | 36.312 | | | | | |
| | | d4 | 4.250 | N3 | 1.71300 v3 | 53.93 |
| r5 | 99.372 | | | | | |
| | | d5 | 1.845~12.505~19.997 | | | |
| | <Second Lens Unit Gr2 - negative> | | | | | |
| r6 | 39.377 | | | | | |
| | | d6 | 1.100 | N4 | 1.80420 v4 | 46.50 |
| r7 | 10.701 | | | | | |
| | | d7 | 4.400 | | | |
| r8 | −32.341 | | | | | |
| | | d8 | 0.950 | N5 | 1.75450 v5 | 51.57 |
| r9 | 21.282 | | | | | |
| | | d9 | 0.300 | | | |
| r10 | 17.036 | | | | | |
| | | d10 | 3.700 | N6 | 1.75000 v6 | 25.14 |
| r11 | −40.855 | | | | | |
| | | d11 | 0.940 | | | |
| r12 | −16.652 | | | | | |
| | | d12 | 1.300 | N7 | 1.69680 v7 | 56.47 |
| r13 | −66.585 | | | | | |
| | | d13 | 11.379~4.400~2.000 | | | |

TABLE 1-continued

<Aperture Diaphragm S, Third Lens Unit Gr3 - positive>

| r14 | ∞ (Aperture Diaphragm S) | | | | |
|---|---|---|---|---|---|
| | | d14 | 0.500 | | |
| | {Front Lens Unit GrA - Hand-shake Correction Lens Unit} | | | | |
| r15 | 75.184 | | | | |
| | | d15 | 1.500 N8 | 1.62041 v8 | 60.29 |
| r16 | −61.919 | | | | |
| | | d16 | 0.500 | | |
| r17 | 33.676 | | | | |
| | | d17 | 1.215 N9 | 1.51728 v9 | 69.43 -- PF |
| r18 | 26.682 | | | | |
| | | d18 | 1.000 | | |
| | {Rear Lens Unit GrB} | | | | |
| r19 | 16.915 | | | | |
| | | d19 | 1.215 N10 | 1.51728 v10 | 69.43 -- PR |
| r20 | 24.253 | | | | |
| | | d20 | 1.500 | | |
| r21 | −61.919 | | | | |
| | | d21 | 1.310 N11 | 1.62041 v11 | 60.29 |
| r22 | −32.276 | | | | |
| | | d22 | 0.110 | | |
| r23 | 18.287 | | | | |
| | | d23 | 4.710 N12 | 1.51742 v12 | 52.15 |
| r24 | −14.950 | | | | |
| | | d24 | 1.360 N13 | 1.80741 v13 | 31.59 |
| r25 | 126.060 | | | | |
| | | d25 | 5.300~1.623~1.000 | | |
| | <Fourth Lens Unit Gr4 - positive> | | | | |
| r26 | 34.239 | | | | |
| | | d26 | 4.820 N14 | 1.51823 v14 | 58.96 |
| r27 | −19.452 | | | | |
| | | d27 | 1.470 | | |
| r28 | −106.937 | | | | |
| | | d28 | 0.100 N15 | 1.51790 v15 | 52.31 |
| r29 | −45.739 | | | | |
| | | d29 | 1.400 N16 | 1.80500 v16 | 40.97 |
| r30 | 42.176 | | | | |
| | | Σd | 66.125~66.128~70.598 | | |

[Aspherical Coefficient]

r28: $\epsilon = 1.0000$
$A4 = -0.10470 \times 10^{-3}$
$A6 = -0.34147 \times 10^{-6}$
$A8 = -0.51713 \times 10^{-9}$
$A10 = -0.14464 \times 10^{-10}$
$A12 = -0.10659 \times 10^{-16}$

TABLE 2

<< Embodiment 2 >>
f = 470.0
FNO = 4.10

| | Radius of Curvature | | Axial Distance | | Refractive Index | Abbe Number |
|---|---|---|---|---|---|---|
| | <First Lens Unit Gr1 - positive> | | | | | |
| r1 | 252.985 | | | | | |
| | | d1 | 12.855 | N1 | 1.49520 v1 | 79.74 |
| r2 | −412.809 | | | | | |
| | | d2 | 0.402 | | | |
| r3 | 145.653 | | | | | |
| | | d3 | 14.863 | N2 | 1.49520 v2 | 79.74 |
| r4 | −2674.154 | | | | | |
| | | d4 | 2.410 | | | |
| r5 | −903.130 | | | | | |
| | | d5 | 5.463 | N3 | 1.65100 v3 | 39.55 |
| r6 | 216.707 | | | | | |
| | | d6 | 134.974 | | | |
| | <Second Lens Unit Gr2 - negative> | | | | | |

TABLE 2-continued

{Fixed Lens Unit GrL}

| | | | | | |
|---|---|---|---|---|---|
| r7 | −145.734 | | | | |
| | | d7 | 2.812 N4 | 1.65446 ν4 | 33.86 |
| r8 | −424.067 | | | | |
| | | d8 | 1.607 | | |
| r9 | 160.143 | | | | |
| | | d9 | 4.178 N5 | 1.69680 ν5 | 56.47 |
| r10 | 1028.521 | | | | |
| | | d10 | 3.214 | | |
| r11 | −874.378 | | | | |
| | | d11 | 4.820 N6 | 1.67339 ν6 | 29.25 |
| r12 | −88.133 | | | | |
| | | d12 | 2.491 N7 | 1.58913 ν7 | 61.11 |
| r13 | ∞ | | | | |
| | | d13 | 2.812 | | |

{Hand-shake Correction Lens Unit GrM}

| | | | | | |
|---|---|---|---|---|---|
| r14 | −1716.385 | | | | |
| r14 | −1716.385 | | | | |
| | | d14 | 2.410 N8 | 1.78100 ν8 | 44.55 |
| r15 | 84.092 | | | | |
| | | d15 | 1.500 | | |
| r16 | 56.872 | | | | |
| | | d16 | 5.000 N9 | 1.49140 ν9 | 57.82 -- PF |
| r17 | 71.858 | | | | |
| | | d17 | 3.500 | | |

{Fixed Lens Unit GrN}

| | | | | | |
|---|---|---|---|---|---|
| r18 | 93.140 | | | | |
| r18 | 93.140 | | | | |
| | | d18 | 2.000 N10 | 1.49140 ν10 | 57.82 -- PR |
| r19 | 70.119 | | | | |
| | | d19 | 11.085 | | |

<Third Lens Unit Gr3 - positive, Aperture Diaphragm S, Protective Glass>

| | | | | | |
|---|---|---|---|---|---|
| r20 | −856.898 | | | | |
| | | d20 | 4.017 N11 | 1.61800 ν11 | 63.39 |
| r21 | −101.065 | | | | |
| | | d21 | 19.282 | | |
| r22 | ∞ (Aperture Diaphragm S) | | | | |
| | | d22 | 44.212 | | |
| r23 | ∞ | | | | |
| | | d23 | 1.446 N12 | 1.51680 ν12 | 64.20 |
| r24 | ∞ | | | | |
| | | Σd | 287.353 | | |

TABLE 3

<< Embodiment 3 >>
f = 236.0
FNO = 2.89

| | Radius of Curvature | Axial Distance | Refractive Index | Abbe Number |
|---|---|---|---|---|

<First Lens Unit Gr1 - positive>

| | | | | | |
|---|---|---|---|---|---|
| r1 | 118.597 | | | | |
| | | d1 | 12.800 N1 | 1.49520 ν1 | 79.74 |
| r2 | −317.987 | | | | |
| | | d2 | 0.336 | | |
| r3 | 91.844 | | | | |
| | | d3 | 11.600 N2 | 1.49520 ν2 | 79.74 |
| r4 | −637.093 | | | | |
| | | d4 | 2.016 | | |
| r5 | −391.734 | | | | |
| | | d5 | 2.960 N3 | 1.68150 ν3 | 36.64 |
| r6 | 132.684 | | | | |
| | | d6 | 62.400 | | |

<Second Lens Unit Gr2 - negative>
{Fixed Lens Unit GrL}

| | | | | | |
|---|---|---|---|---|---|
| r7 | −104.212 | | | | |
| | | d7 | 2.000 N4 | 1.65446 ν4 | 33.86 |
| r8 | −163.145 | | | | |

TABLE 3-continued

| | | | | | |
|---|---|---|---|---|---|
| | | d8 | 1.080 | | |
| r9 | 85.118 | | | | |
| | | d9 | 3.200 N5 | 1.60311 ν5 | 60.74 |
| r10 | 474.044 | | | | |
| | | d10 | 2.400 | | |

{Hand-shake Correction Lens Unit GrM}

| | | | | | |
|---|---|---|---|---|---|
| r11 | −1363.419 | | | | |
| | | d11 | 5.200 N6 | 1.71736 ν6 | 29.42 |
| r12 | −53.358 | | | | |
| | | d12 | 1.480 N7 | 1.60311 ν7 | 60.74 |
| r13 | 338.866 | | | | |
| | | d13 | 2.520 | | |
| r14 | −173.400 | | | | |
| | | d14 | 1.360 N8 | 1.67000 ν8 | 57.07 |
| r15 | 52.435 | | | | |
| | | d15 | 2.000 | | |
| r16 | 40.163 | | | | |
| | | d16 | 1.500 N9 | 1.58340 ν9 | 30.23 -- PF |
| r17 | 50.774 | | | | |
| | | d17 | 2.000 | | |

{Fixed Lens Unit GrN}

| | | | | | |
|---|---|---|---|---|---|
| r18 | 70.431 | | | | |
| | | d18 | 2.000 N10 | 1.58340 ν10 | 30.23 -- PR |
| r19 | 47.223 | | | | |
| | | d19 | 9.000 | | |

<Aperture Diaphragm S, Third Lens Unit Gr3 - positive, Protective Glass>

| | | | | | |
|---|---|---|---|---|---|
| r20 | ∞ (Aperture Diaphragm S) | | | | |
| | | d20 | 1.200 | | |
| r21 | 521.110 | | | | |
| | | d21 | 5.600 N11 | 1.60311 ν11 | 60.74 |
| r22 | −33.634 | | | | |
| | | d22 | 1.280 N12 | 1.65446 ν12 | 33.86 |
| r23 | −63.807 | | | | |
| | | d23 | 24.640 | | |
| r24 | ∞ | | | | |
| | | d24 | 1.440 N13 | 1.51680 ν13 | 64.20 |
| r25 | ∞ | | | | |
| | | Σd | 162.012 | | |

TABLE 4

<< Embodiment 4 >>
f = 82.2~160.0~233.6
FNO = 4.60~5.81~6.19

| | Radius of Curvature | Axial Distance | Refractive Index | Abbe Number |
|---|---|---|---|---|

<First Lens Unit Gr1 - positive>

| | | | | | |
|---|---|---|---|---|---|
| r1 | 971.931 | | | | |
| | | d1 | 1.700 N1 | 1.61293 ν1 | 36.96 |
| r2 | 49.221 | | | | |
| | | d2 | 6.460 N2 | 1.49310 ν2 | 83.58 |
| r3 | −1678.106 | | | | |
| | | d3 | 0.100 | | |
| r4 | 56.111 | | | | |
| | | d4 | 3.820 N3 | 1.49310 ν3 | 83.58 |
| r5 | 859.262 | | | | |
| | | d5 | 3.300~27.890~41.425 | | | |

<Second Lens Unit Gr2 - negative>
{Front Lens Unit GrA - Hand-shake Correction Lens Unit}

| | | | | | |
|---|---|---|---|---|---|
| r6 | −69.399 | | | | |
| | | d6 | 1.830 N4 | 1.71300 ν4 | 53.93 |
| r7 | 34.412 | | | | |
| | | d7 | 3.000 | | |
| r8 | 38.193 | | | | |
| | | d8 | 2.750 N5 | 1.67339 ν5 | 29.25 |
| r9 | 1893.115 | | | | |
| | | d9 | 2.000 | | |
| r10 | −35.714 | | | | |
| | | d10 | 1.215 N6 | 1.51728 ν6 | 69.43 -- PF |

TABLE 4-continued

| | | | | | | |
|---|---|---|---|---|---|---|
| r11 | −29.097 | | | | | |
| | | d11 | 2.000 | | | |
| | | {Rear Lens Unit GrB} | | | | |
| r12 | −24.999 | | | | | |
| | | d12 | 1.215 | N7 | 1.51728 v7 | 69.43 -- PR |
| r13 | −30.588 | | | | | |
| | | d13 | 20.004~4.713~1.036 | | | |
| | | <Aperture Diaphragm S, Third Lens Unit Gr3 - positive> | | | | |
| r14 | ∞ (Aperture Diaphragm S) | | | | | |
| | | d14 | 1.380 | | | |
| r15 | 60.855 | | | | | |
| | | d15 | 1.300 | N8 | 1.84666 v8 | 23.82 |
| r16 | 26.095 | | | | | |
| | | d16 | 2.460 | | | |
| r17 | 41.450 | | | | | |
| | | d17 | 2.840 | N9 | 1.51680 v9 | 64.20 |
| r18 | −111.975 | | | | | |
| | | d18 | 0.400 | | | |
| r19 | 35.623 | | | | | |
| | | d19 | 4.550 | N10 | 1.51680 v10 | 64.20 |
| r20 | −42.960 | | | | | |
| | | d20 | 20.260~9.024~0.874 | | | |
| | | <Fourth Lens Unit Gr4 - negative> | | | | |
| r21 | 206.481 | | | | | |
| | | d21 | 1.080 | N11 | 1.71300 v11 | 53.93 |
| r22 | 24.106 | | | | | |
| | | d22 | 1.540 | | | |
| r23 | −195.003 | | | | | |
| | | d23 | 3.480 | N12 | 1.67339 v12 | 29.25 |
| r24 | −18.789 | | | | | |
| | | d24 | 1.130 | N13 | 1.75450 v13 | 51.57 |
| r25 | ∞ | | | | | |
| | | Σd | 89.815~87.878~89.586 | | | |

TABLE 5

<< Embodiment 5 >>
f = 82.2~160.0~233.6
FNO = 4.60~5.81~6.60

| | Radius of Curvature | | Axial Distance | | Refractive Index | Abbe Number |
|---|---|---|---|---|---|---|
| | <First Lens Unit Gr1 - positive> | | | | | |
| r1 | 103.105 | | | | | |
| | | d1 | 1.700 | N1 | 1.61293 v1 | 36.96 |
| r2 | 47.562 | | | | | |
| | | d2 | 6.460 | N2 | 1.49310 v2 | 83.58 |
| r3 | −214.862 | | | | | |
| | | d3 | 0.100 | | | |
| r4 | 50.735 | | | | | |
| | | d4 | 3.820 | N3 | 1.49310 v3 | 83.58 |
| r5 | 247.066 | | | | | |
| | | d5 | 3.300~25.679~34.769 | | | |
| | | <Second Lens Unit Gr2 - negative> | | | | |
| | | {Front Lens Unit GrA - Hand-shake Correction Lens Unit} | | | | |
| r6 | −70.232 | | | | | |
| | | d6 | 1.830 | N4 | 1.71300 v4 | 53.93 |
| r7 | 33.675 | | | | | |
| | | d7 | 1.000 | | | |
| r8 | 20.095 | | | | | |
| | | d8 | 2.000 | N5 | 1.51728 v5 | 69.43 -- PF |
| r9 | 24.008 | | | | | |
| | | d9 | 2.000 | | | |
| | | {Rear Lens Unit GrB} | | | | |
| r10 | 30.117 | | | | | |
| | | d10 | 1.215 | N6 | 1.51728 v6 | 69.43 -- PR |
| r11 | 19.468 | | | | | |
| | | d11 | 1.000 | | | |
| r12 | 27.326 | | | | | |

TABLE 5-continued

| | | | | | | |
|---|---|---|---|---|---|---|
| | | d12 | 2.750 | N7 | 1.67339 v7 | 29.25 |
| r13 | 157.462 | | | | | |
| | | d13 | 22.913~7.665~1.036 | | | |
| | | <Aperture Diaphragm S, Third Lens Unit Gr3 - positive> | | | | |
| r14 | ∞ (Aperture Diaphragm S) | | | | | |
| | | d14 | 1.380 | | | |
| r15 | 86.768 | | | | | |
| | | d15 | 1.300 | N8 | 1.84666 v8 | 23.82 |
| r16 | 28.577 | | | | | |
| | | d16 | 2.460 | | | |
| r17 | 46.617 | | | | | |
| | | d17 | 2.840 | N9 | 1.51680 v9 | 64.20 |
| r18 | −58.745 | | | | | |
| | | d18 | 0.400 | | | |
| r19 | 34.744 | | | | | |
| | | d19 | 4.550 | N10 | 1.51680 v10 | 64.20 |
| r20 | −42.470 | | | | | |
| | | d20 | 18.566~7.464~0.874 | | | |
| | | <Fourth Lens Unit Gr4 - negative> | | | | |
| r21 | 488.716 | | | | | |
| | | d21 | 1.080 | N11 | 1.71300 v11 | 53.93 |
| r22 | 24.791 | | | | | |
| | | d22 | 1.540 | | | |
| r23 | −153.247 | | | | | |
| | | d23 | 3.480 | N12 | 1.67339 v12 | 29.25 |
| r24 | −17.314 | | | | | |
| | | d24 | 1.130 | N13 | 1.75450 v13 | 51.57 |
| r25 | ∞ | | | | | |
| | | Σd | 88.815~84.843~80.715 | | | |

TABLE 6

| | S(PF) | S(PR) | S(PR)/S(PF) |
|---|---|---|---|
| Embodiment 1 | −8.630 | 5.610 | −0.65 |
| Embodiment 2 | 8.593 | −7.199 | −0.84 |
| Embodiment 3 | 8.570 | −5.069 | −0.59 |
| Embodiment 4 | −9.795 | 9.947 | −1.02 |
| Embodiment 5 | 11.270 | −4.656 | −0.41 |

TABLE 7

| | P(PF) | P(PR) | P(PR)/P(PF) |
|---|---|---|---|
| Embodiment 1 | −0.0038 | 0.0098 | −2.58 |
| Embodiment 2 | 0.002 | −0.0017 | −0.85 |
| Embodiment 3 | 0.0032 | −0.0039 | −1.22 |
| Embodiment 4 | 0.0035 | −0.0035 | −1.00 |
| Embodiment 5 | 0.0049 | −0.0090 | −1.84 |

TABLE 8

| | |P(PF)|/P | | |P(PR)|/P | |
|---|---|---|---|---|
| | [W] | [T] | [W] | [T] |
| Embodiment 1 | 0.09 | 0.30 | 0.22 | 0.76 |
| Embodiment 2 | 0.94 | | 0.80 | |
| Embodiment 3 | 0.76 | | 0.92 | |
| Embodiment 4 | 0.29 | 0.82 | 0.29 | 0.82 |
| Embodiment 5 | 0.40 | 1.14 | 0.74 | 2.10 |

TABLE 9

| | d(PF, PR) · P | | |
|---|---|---|---|
| | [W] | [T] | MT/MW |
| Embodiment 1 | 0.044 | 0.013 | 2.17 |
| Embodiment 2 | | 0.0074 | (Single Focal Length) |
| Embodiment 3 | | 0.0085 | (Single Focal Length) |
| Embodiment 4 | 0.024 | 0.0086 | 1.78 |
| Embodiment 5 | 0.024 | 0.0086 | 1.92 |

What is claimed is:

1. An optical lens comprising:

a movable lens unit movable in a direction perpendicular to an optical axis of the optical lens system to correct an image blur resulting from vibration of the optical lens system, the movable lens unit having a first lens element disposed at an image-side end thereof; and a fixed lens unit fixed in a direction perpendicular to the optical axis of the optical lens system to correct image blur and next to the movable lens unit, the fixed lens unit having a second lens element disposed at an object-side end thereof, wherein each of the first and second lens elements have an object-side surface and an image-side surface bordering air, wherein said first and second lens elements satisfy the following conditions:

$-5 < SL2/SL1 < 0;$ $1.0 < SL1;$ $PL2/PL1 < 0;$ where
SL1: shape factor of the first lens element;
SL2: shape factor of the second lens element;
PL1: refractive power of the first lens element;
PL2: refractive power of the second lens element; and
the shape factors SL1 and SL2 are defined as follows:

$SL1 = (CRR_{L1} + CRF_{L1})/(CRR_{L1} - CRF_{L1});$ $SL2 = (CRR_{L2} + CRF_{L2})/(CRR_{L2} - CRF_{L2});$ where
$CRR_{L1}$: radius of curvature of an image-side surface of the first lens element;
$CRR_{L1}$: radius of curvature of an object-side surface of the first lens element;
$CRR_{L2}$ radius of curvature of an image-side surface of the first lens element;
$CRRL_2$: radius of curvature of an object-side surface of the first lens element.

2. An optical lens system as claimed in claim 1, wherein at least one of said first and second lens elements is made of plastic.

3. An optical lens system as claimed in claim 1, which further satisfies the following condition:

$-1.5 < SL2/SL1 < -0.2$

4. An optical lens system as claimed in claim 1, which further satisfies the following condition:

$2.2 < SL1$

5. An optical lens system as claimed in claim 1, which further satisfies the following conditions:

$1.0 < SL2$ $0.1 < |PL2|/P < 2.5$ where
P: refractive power of the entire system.

6. An optical lens system as claimed in claim 5, which further satisfies the following condition:

$2.2 < SL2$

7. An optical lens system as claimed in claim 6, which further satisfies the following condition:

$0.1 < |PL2|/P < 1.0$

8. An optical lens system as claimed in claim 5, which further satisfies the following condition:

$0.1 < |PL2|/P < 1.0$

9. An optical lens system as claimed in claim 1, which further satisfies the following conditions:

$SL2 < 0$ $0.1 < |PL2|/P < 2.5$ where
P: refractive power of the entire system.

10. An optical lens system as claimed in claim 9, which further satisfies the following condition:

$SL2 < -0.7$

11. An optical lens system as claimed in claim 1, which further satisfies the following condition:

$0.1 < |PL1|/P < 2.5$ where
P: refractive power of the entire system.

12. An optical lens system as claimed in claim 11, which further satisfies the following condition:

$0.1 < |PL1|/P < 1.0$

13. An optical lens system as claimed in claim 1, which further satisfies the following condition:

$0.003 < d_{12} \cdot P < 0.1;$ $d_{12}$: axial distance between the first and second lens elements L1 and L2; and
P: refractive power of the entire system.

14. An optical lens system as claimed in claim 13, which further has an aperture diaphragm disposed on an object side of said movable lens unit.

15. An optical lens system as claimed in claim 1, which further has an aperture diaphragm disposed in said movable lens unit.

16. An optical lens system as claimed in claim 1, which further has an aperture diaphragm disposed on an image side of said movable lens unit.

17. An optical lens system as claimed in claim 1, which further satisfies the following condition:

$$0.4 < MT/MW < 2.5$$

where
MT: movement amount of the movable lens unit, at a telephoto end;
MW: movement amount of the movable lens unit, at a wide-angle end.

18. An optical lens system as claimed in claim 1, which further satisfies the following condition:

$$\nu p > \nu n$$

where
νp: Abbe number of positive lens elements in the movable lens unit;
νn: Abbe number of negative lens elements in the movable lens unit.

19. An optical lens comprising:
a movable lens unit movable in a direction perpendicular to an optical axis of the optical lens system to correct an image blur resulting from vibration of the optical lens system, the movable lens unit having a first lens element disposed at an image-side end thereof; and
a fixed lens unit fixed in a direction perpendicular to the optical axis of the optical lens system to correct image blur and next to the movable lens unit, the fixed lens unit having a second lens element disposed at an object-side end thereof,
wherein each of the first and second lens elements have an object-side surface and an image-side surface bordering air,
wherein said first and second lens elements satisfy the following conditions:

$$-5 < SL2/SL1 < 0;$$

$$SL1 < 0;$$

$$PL2/PL1 < 0;$$

where
SL1: shape factor of the first lens element;
SL2: shape factor of the second lens element;
PL1: refractive power of the first lens element;
PL2: refractive power of the second lens element;
and the shape factors SL1 and SL2 are defined as follows:

$$SL1 = (CRR_{L1} + CRF_{L1})/(CRR_{L1} - CRF_{L1});$$

$$SL2 = (CRR_{L2} + CRF_{L2})/(CRR_{L2} - CRF_{L2});$$

where
$CRR_{L1}$: radius of curvature of an image-side surface of the first lens element;
$CRR_{L1}$: radius of curvature of an object-side surface of the first lens element;
$CRR_{L2}$: radius of curvature of an image-side surface of the first lens element;
$CRR_{L2}$: radius of curvature of an object-side surface of the first lens element.

20. An optical lens system as claimed in claim 19, wherein at least one of said first and second lens elements is made of plastic.

21. An optical lens system as claimed in claim 19, which further satisfies the following condition:

$$-1.5 < SL2/SL1 < -0.2$$

22. An optical lens system as claimed in claim 19, which further satisfies the following condition:

$$SL1 < -0.7$$

23. An optical lens system as claimed in claim 19, which further satisfies the following conditions:

$$1.0 < SL2$$

$$0.1 < |PL2|/P < 2.5$$

where
P: refractive power of the entire system.

24. An optical lens system as claimed in claim 23, which further satisfies the following condition:

$$2.2 < SL2$$

25. An optical lens system as claimed in claim 24, which further satisfies the following condition:

$$0.1 < |PL2|/P < 1.0$$

26. An optical lens system as claimed in claim 23, which further satisfies the following condition:

$$0.1 < |PL2|/P < 1.0$$

27. An optical lens system as claimed in claim 19, which further satisfies the following conditions:

$$SL2 < 0$$

$$0.1 < |PL2|/P < 2.5$$

where
P: refractive power of the entire system.

28. An optical lens system as claimed in claim 27, which further satisfies the following condition:

$$SL2 < -0.7$$

29. An optical lens system as claimed in claim 19, which further satisfies the following condition:

$$0.1 < |PL1|/P < 2.5$$

where
P: refractive power of the entire system.

30. An optical lens system as claimed in claim 29, which further satisfies the following condition:

$$0.1 < |PL1|/P < 1.0$$

31. An optical lens system as claimed in claim 19, which further satisfies the following condition:

$$0.003 < d_{12} \cdot P < 0.1;$$

where
$d_{12}$: axial distance between the first and second lens elements L1 and L2; and
P: refractive power of the entire system.

32. An optical lens system as claimed in claim 19, which further has an aperture diaphragm disposed on an object side of said movable lens unit.

33. An optical lens system as claimed in claim 19, which further has an aperture diaphragm disposed in said movable lens unit.

34. An optical lens system as claimed in claim 19, which further has an aperture diaphragm disposed on an image side of said movable lens unit.

35. An optical lens system as claimed in claim 19, which further satisfies the following condition:

$$0.4 < MT/MW < 2.5$$

where

MT: movement amount of the movable lens unit, at a telephoto end;

MW: movement amount of the movable lens unit, at a wide-angle end.

36. An optical lens system as claimed in claim 19, which further satisfies the following condition:

$$\nu p > \nu n$$

where $\nu p$: Abbe number of positive lens elements in the movable lens unit;

$\nu n$: Abbe number of negative lens elements in the movable lens unit.

37. A zoom lens system as claimed in claim 19, wherein the first lens element L1 and the second lens element L2 have an air space between them.

* * * * *